Oct. 29, 1957 B. J. NIGRELLI 2,811,087
CARTON SETTING UP AND ASSEMBLING MACHINE
Filed April 8, 1954 13 Sheets-Sheet 1

Inventor:
Biagio J. Nigrelli
By: E. A. Wagonseller
Atty

Oct. 29, 1957 B. J. NIGRELLI 2,811,087
CARTON SETTING UP AND ASSEMBLING MACHINE
Filed April 8, 1954 13 Sheets-Sheet 2

Oct. 29, 1957  B. J. NIGRELLI  2,811,087
CARTON SETTING UP AND ASSEMBLING MACHINE
Filed April 8, 1954  13 Sheets-Sheet 3

Inventor:
Biagio J. Nigrelli
By: E. W. Wagmseller
Atty.

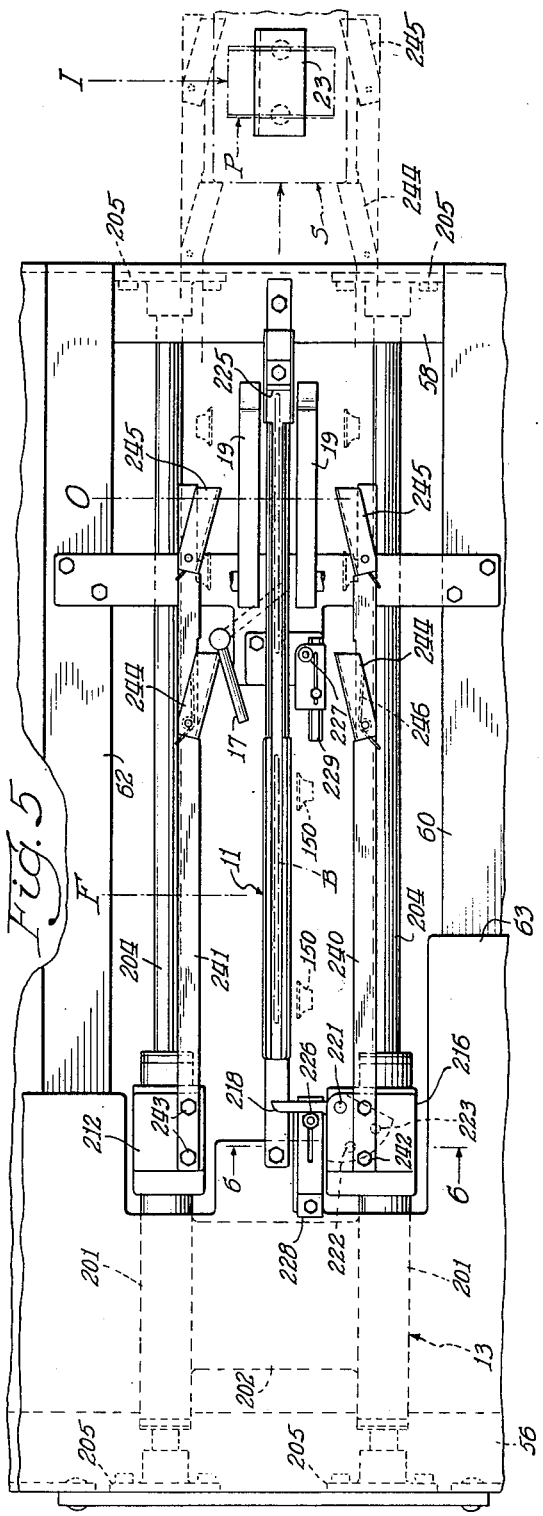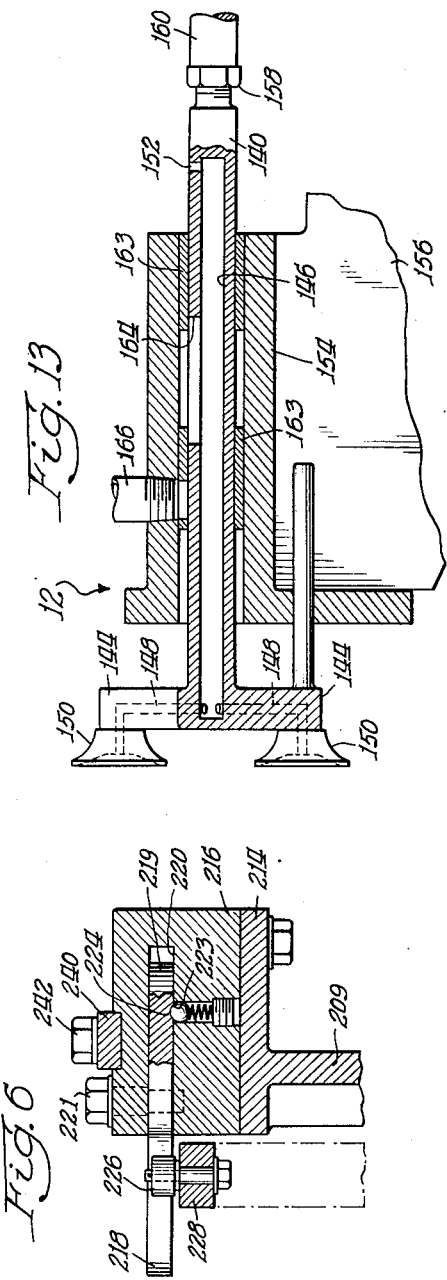

Oct. 29, 1957   B. J. NIGRELLI   2,811,087
CARTON SETTING UP AND ASSEMBLING MACHINE
Filed April 8, 1954   13 Sheets-Sheet 6
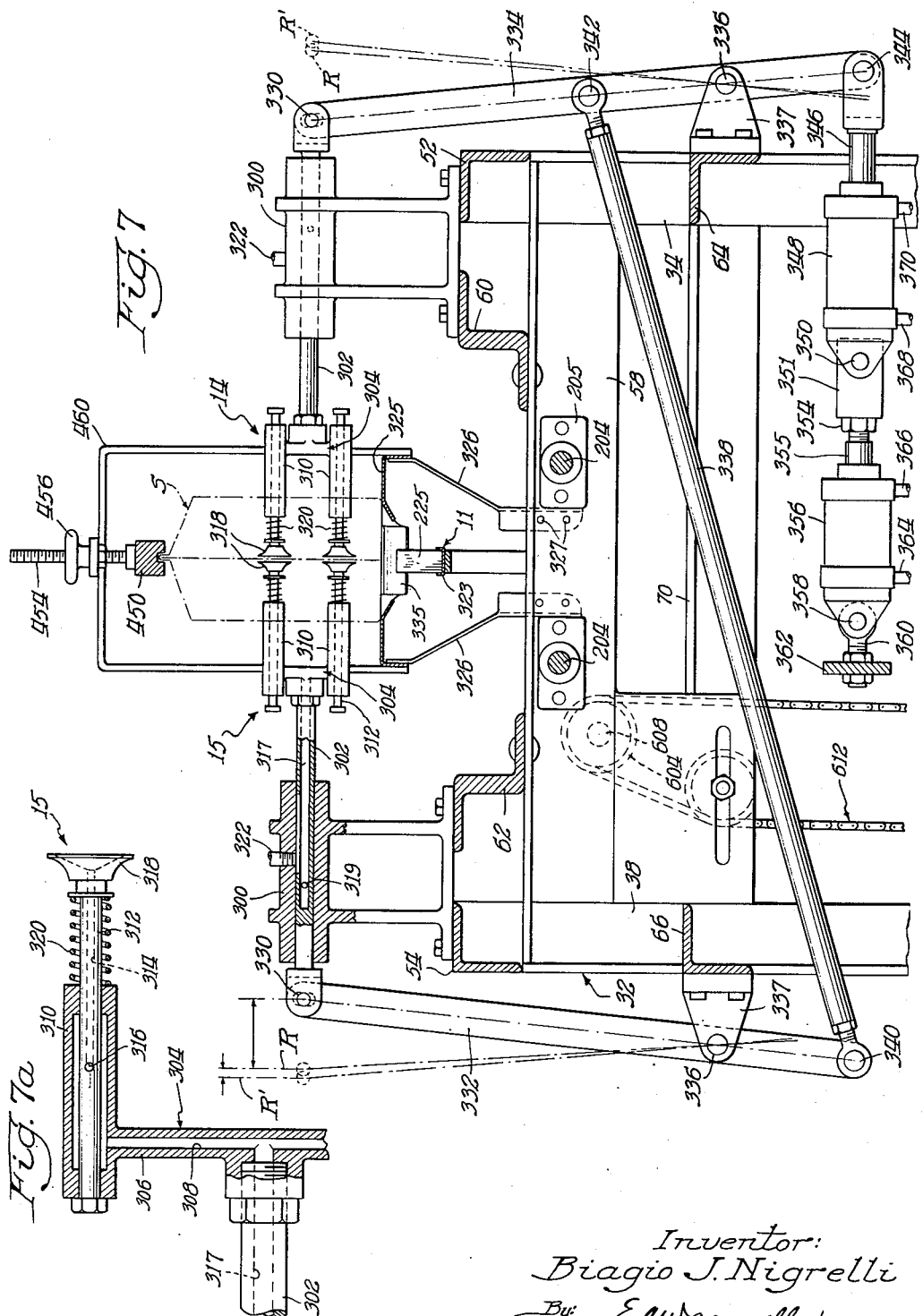
Inventor:
Biagio J. Nigrelli
By: E. A. Wagonseller
Atty.

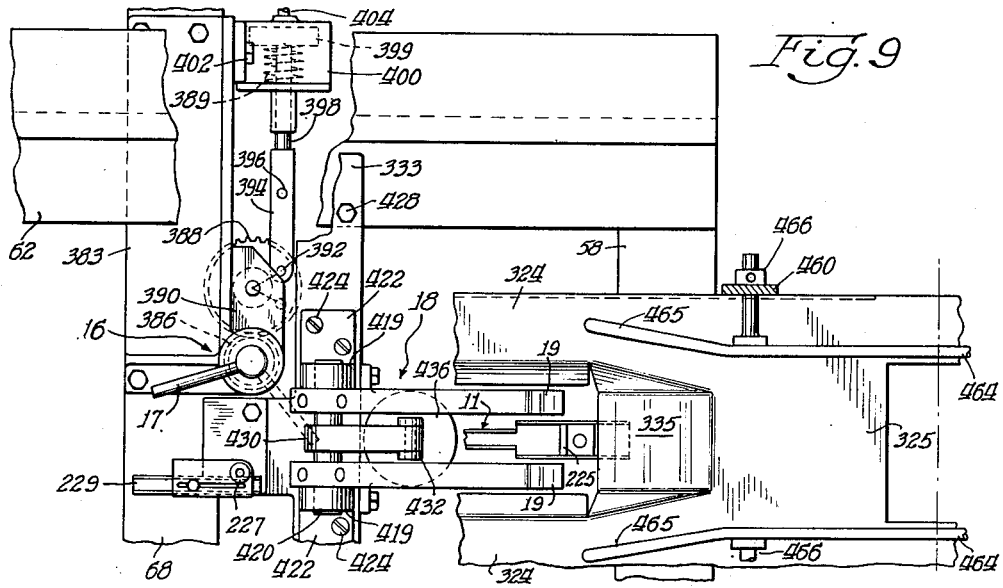
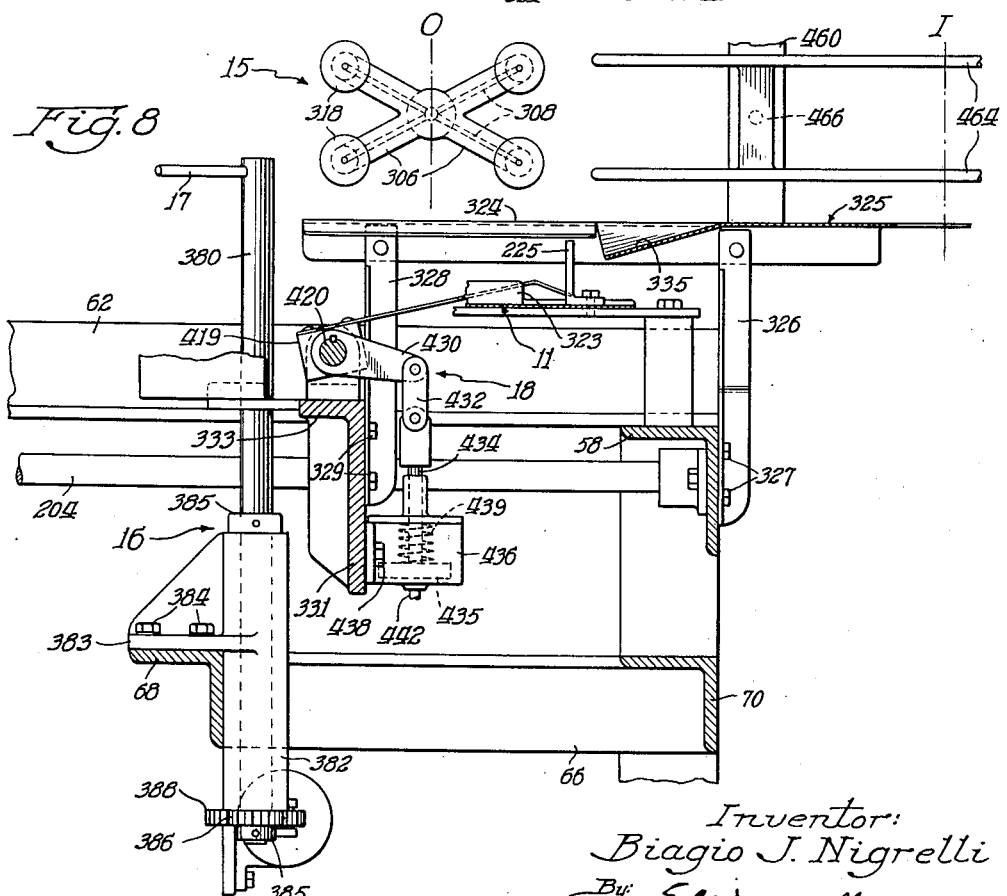

Oct. 29, 1957   B. J. NIGRELLI   2,811,087
CARTON SETTING UP AND ASSEMBLING MACHINE
Filed April 8, 1954   13 Sheets-Sheet 8
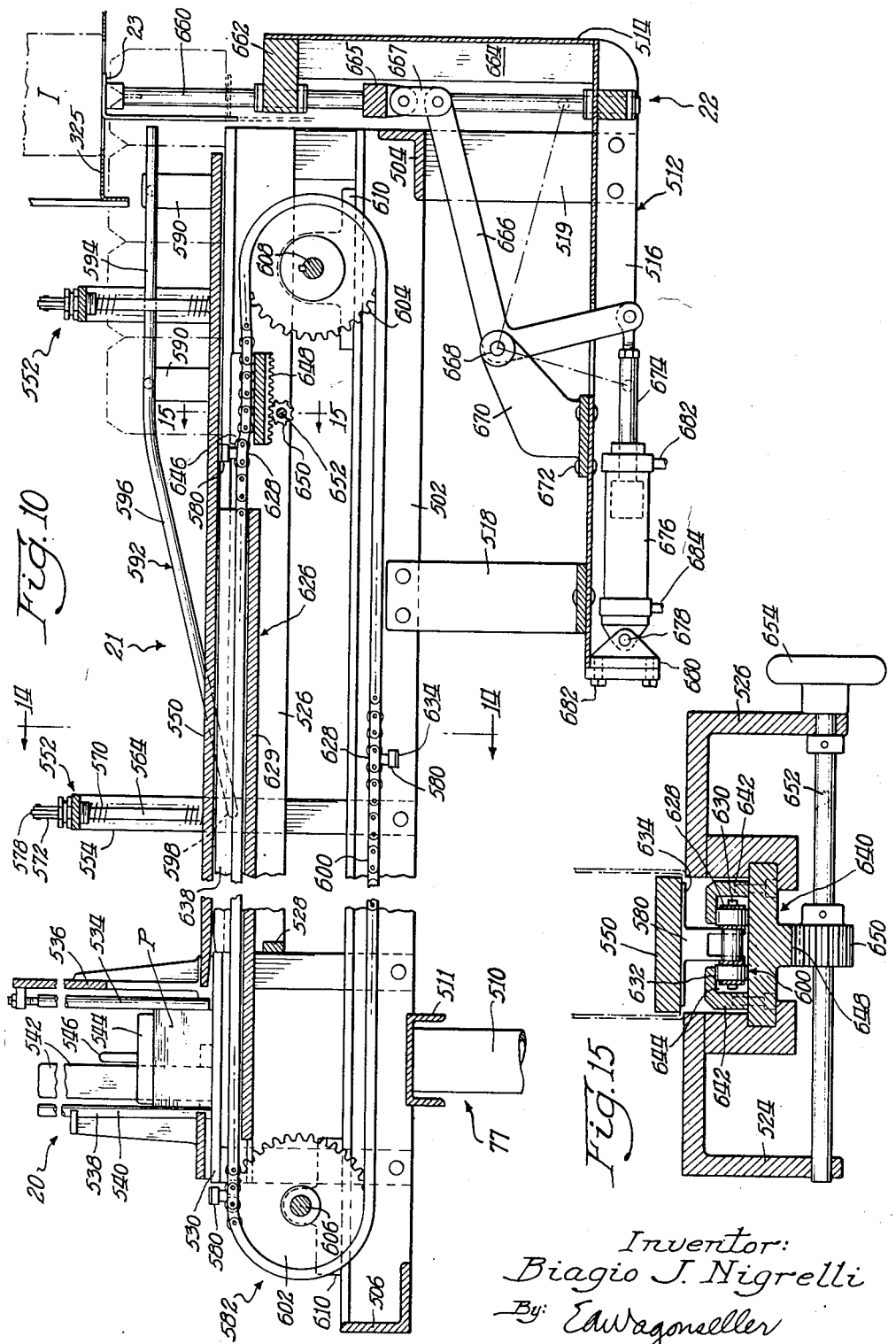
Inventor:
Biagio J. Nigrelli
By: Ed Wagonseller
Atty.

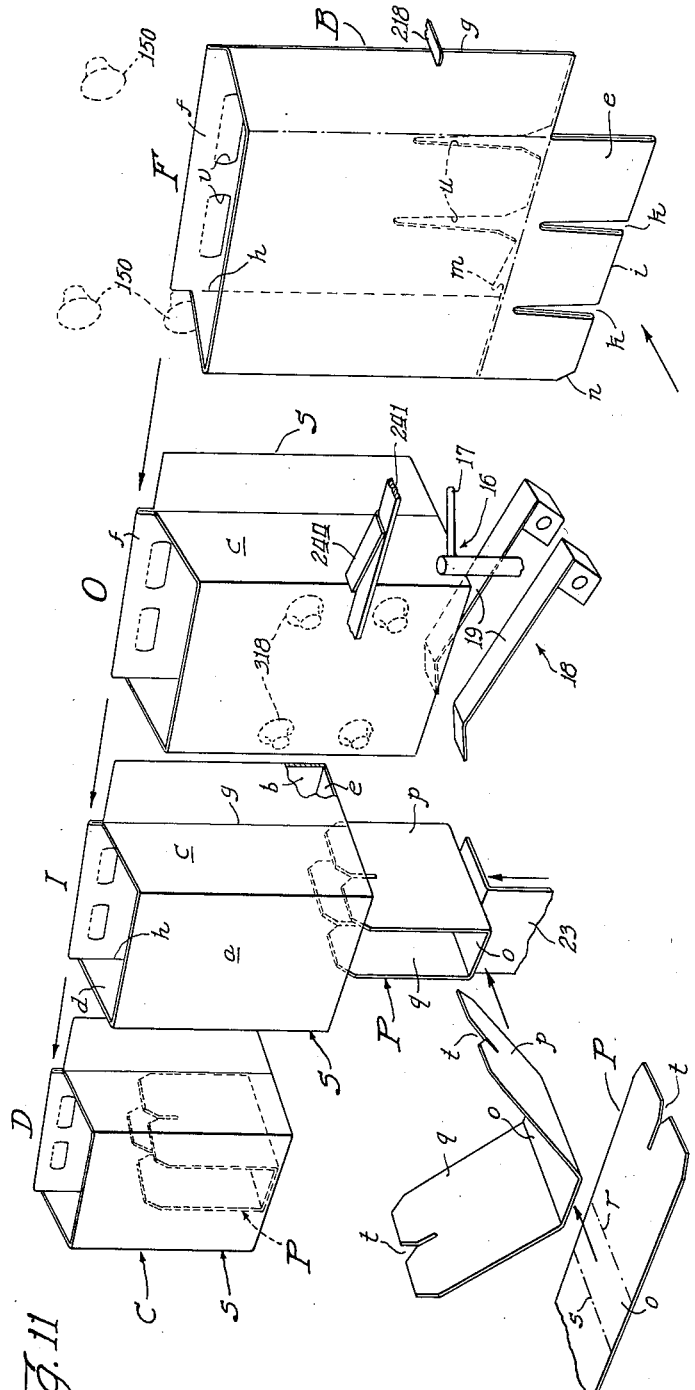

Oct. 29, 1957 B. J. NIGRELLI 2,811,087
CARTON SETTING UP AND ASSEMBLING MACHINE
Filed April 8, 1954 13 Sheets-Sheet 10
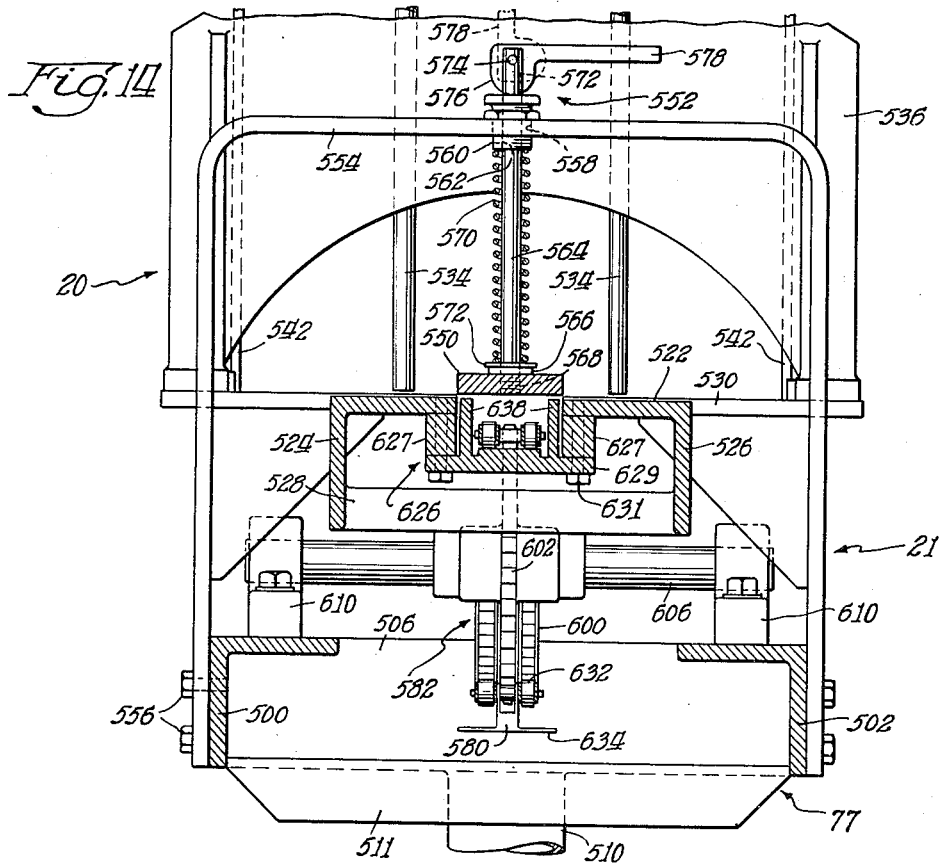
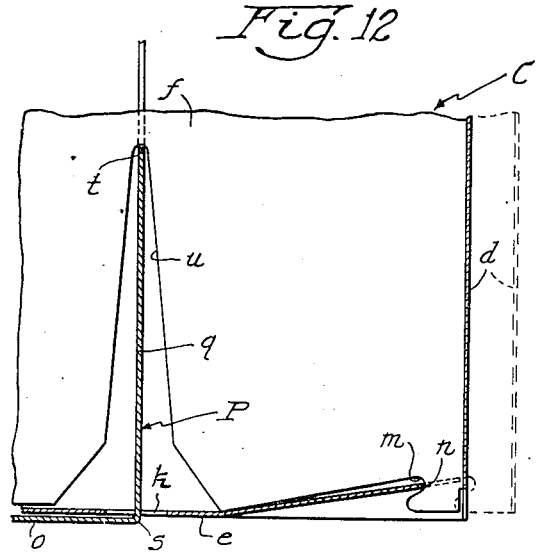
Inventor:
Biagio J. Nigrelli
By: EaWagonseller
Atty.

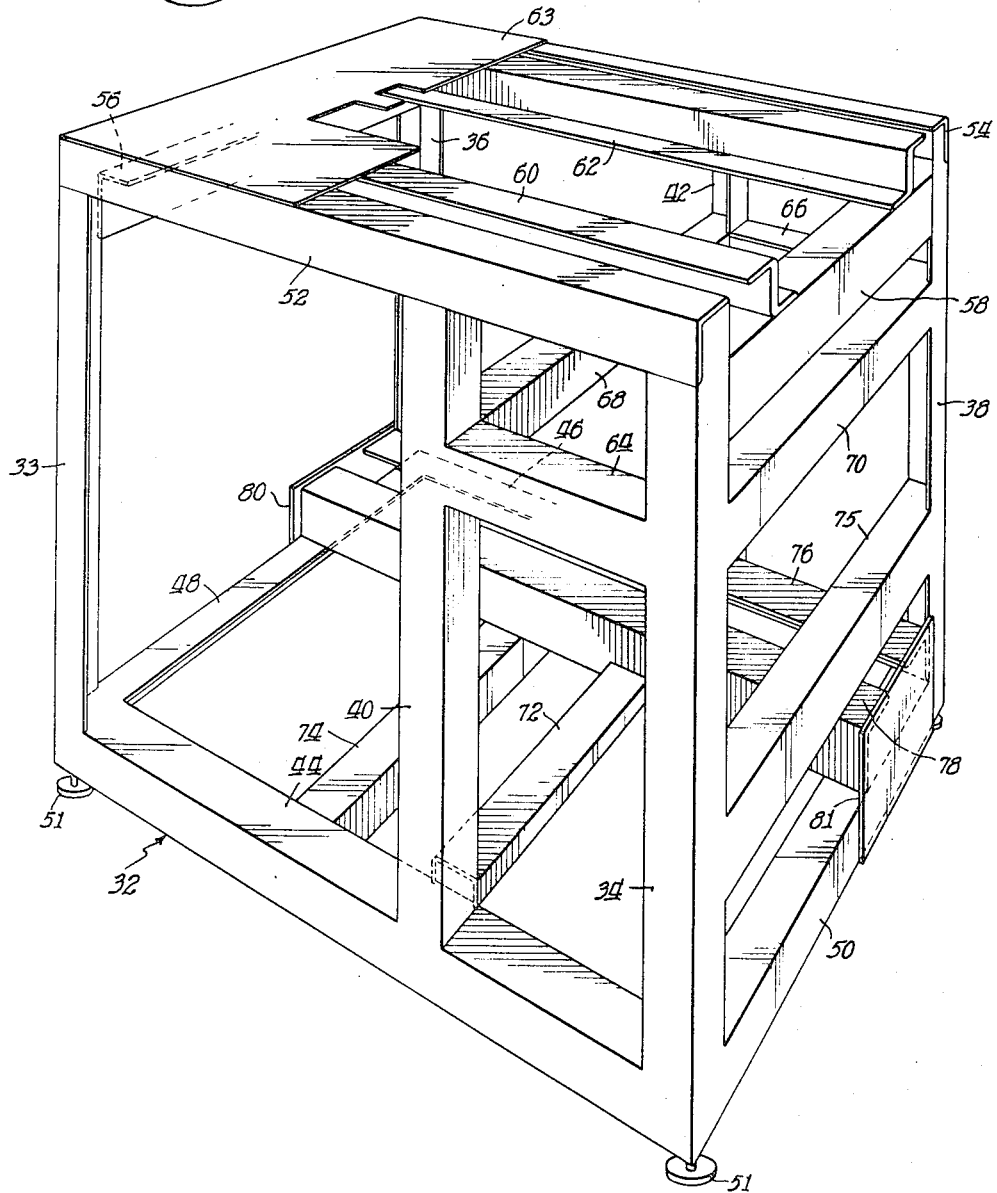

Oct. 29, 1957 B. J. NIGRELLI 2,811,087
CARTON SETTING UP AND ASSEMBLING MACHINE
Filed April 8, 1954 13 Sheets-Sheet 13
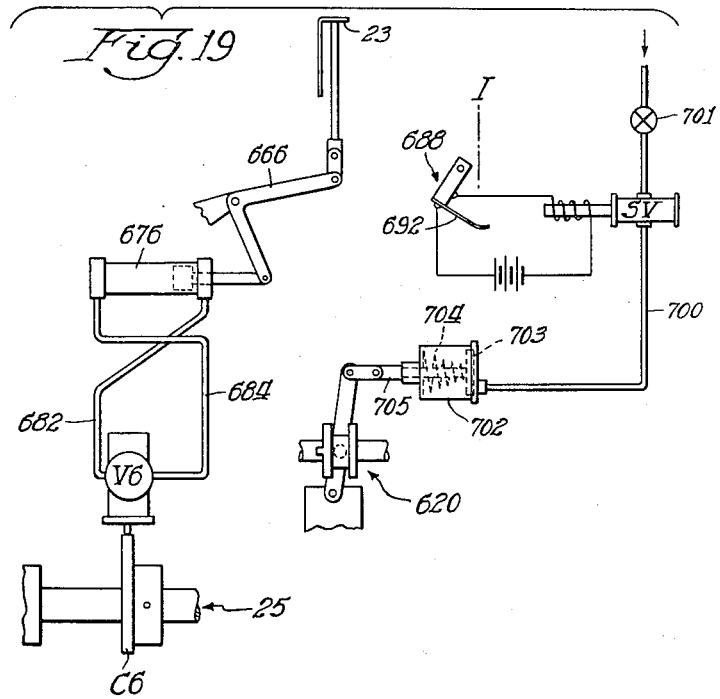
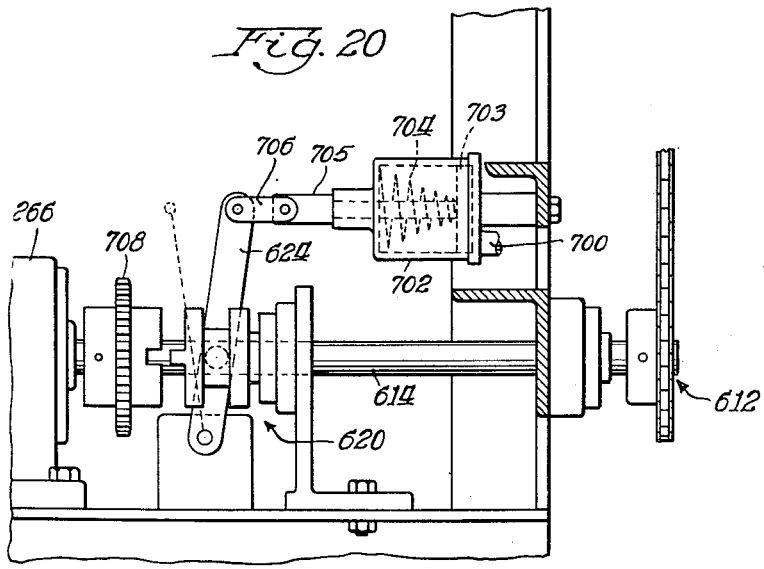
Inventor:
Biagio J. Nigrelli
By: Ed Wagonseller
Atty

2,811,087

United States Patent Office

Patented Oct. 29, 1957

2,811,087

CARTON SETTING UP AND ASSEMBLING MACHINE

Biagio J. Nigrelli, Skokie, Ill., assignor to Container Corporation of America, Chicago, Ill., a corporation of Delaware Application April 8, 1954, Serial No. 421,869

9 Claims. (Cl. 93—39)

The improved carton setting up and assembling machine comprising the present invention has been designed for use primarily in connection with the squaring up or opening and assembling of collapsed carton shell blanks having longitudinal partition members integrally associated therewith and which, when opened, are adapted to receive therein a partition member providing transverse partition walls which, in combination with the integral longitudinal partition wall, divide the opened carton shell into a number of article-receiving compartments. The mechanism is however capable of operating upon other types of cartons and the same may, without modification, be employed in connection with the opening or squaring up of carton blanks having a full complement of partition walls.

The invention has for its primary object the provision of a cyclically operable machine whereby carton shells or blanks in their collapsed form may be fed in rapid succession from bulk and delivered to a setting up mechanism which operates in an improved manner to open or square up the collapsed shells and deliver the opened shells to an inserting mechanism by means of which a partition member is inserted into each shell to complete the carton assembly.

An equally important object of the invention is the provision of a machine of this character in which the partition members in flat blank form are likewise fed from bulk by a partition blank feeding and folding mechanism associated with the machine, which mechanism also operates in an improved manner to withdraw partition blanks from the supply of blanks and progressively advance the same toward the inserting mechanism while at the same time progressively folding the blanks so that upon delivery thereof to the inserting mechanism the blanks are completely squared up and in condition for insertion into the opened carton shells without further operation thereupon.

Carton shells of the type capable of being handled by the present machine are frequently of the carrier carton type having four rectangular side walls, a medial longitudinal partition wall and a shell bottom, the partition wall of the squared up carton shell affording carrying means for the completed carton. Such carton shells, whether they be provided with integral transverse partition walls or whether they require the insertion thereon of a separate partition member to supply the transverse walls, include certain locking features wherein one edge of the shell bottom is caused to interlock with a notch provided in the integral longitudinal partition wall to maintain the shell in its squared up condition. Among the principal features of the present machine is the provision of a flexing means for momentarily distorting the partially squared up carton shell in such a manner that the integral partition wall is displaced longitudinally to cause the notch therein to assume an offset position, together with a second flexing means for distorting the shell in such a manner that the edge of the shell bottom is brought into register with the offset partition notch so that upon release of the carton by the first flexing means, the notch and edge will automatically move into interlocking engagement.

The machine of the present invention possesses numerous other features of novelty, all of which will become more readily apparent as the nature of the invention is better understood. Among these are a novel form of vacuum cylinder for automatically controlling the application of subatmospheric pressure to certain vacuum cups employed in connection with the carton shell blank feeding mechanism and also with the carton blank opening mechanism associated with the machine; a novel means for disabling the feed of a partition member in the absence of a carton shell to receive it; a novel means for imparting varying degrees of movement or "throw" to a plunger-actuated lever associated with the carton shell opening mechanism whereby the mechanism is caused to clear the carton shell sides after the shell has been squared up preparatory to removal of the shell bodily from the mechanism; a novel form of partition blank feeding and folding mechanism which may be adjusted to accommodate partition blanks of varying thickness of the paperboard material and of varying transverse width; a novel form of safety release mechanism for relieving a jam in the partition blank feed line, and a novel form of carton ejecting mechanism which will operate to remove the leading opening carton shell from the machine, including the last opened shell after the supply of blanks has been exhausted.

Other objects, advantages and features of novelty not at this time enumerated will become more readily apparent as the following description proceeds.

In the accompanying drawings, forming a part of this specification, a preferred embodiment of the invention has been shown.

In these drawings:

Fig. 1a is a plan view of the guide and carton shell sensing device employed in connection with the invention;

Fig. 2a is a vertical cross-sectional view taken substantially along line 2a—2a of Fig. 2, illustrating the construction permitting adjustment of the width of the holder for the collapsed carton blanks;

Fig. 5 is a horizontal sectional view taken substantially along line 5—5 of Fig. 1;

Fig. 6 is a detail vertical sectional view taken substantially along line 6—6 of Fig. 1;

Fig. 7 is a vertical sectional view taken substantially along line 7—7 of Fig. 1;

Fig. 7a is an enlarged fragmentary detail view illustrating the structure of the carton opening mechanism;

Fig. 8 is an enlarged vertical sectional view taken substantially along line 8—8 of Fig. 2;

Fig. 9 is a top plan view of the structure shown in Fig. 8;

Fig. 10 is a sectional view taken substantially along line 10—10 of Fig. 1;

Fig. 11 is a perspective view, schematic in its representation, illustrating the steps involved during the operation of the machine in setting up a carton shell blank and in applying thereto a partition insert;

Fig. 12 is a fragmentary detail sectional view of a carton shell of the type shown in Fig. 11, illustrating the construction of the longitudinal partition to provide a lock to engage the bottom panel which is serving to maintain the carton in squared up condition;

Fig. 13 is a vertical sectional view taken substantially centrally through a vacuum cylinder and plunger mechanism employed in connection with the present invention;

Fig. 14 is a sectional view taken along line 14—14 of Fig. 10, showing the safety release and adjusting mechanism employed in connection with the invention;

Fig. 15 is a fragmentary sectional view taken substantially along line 15—15 of Fig. 10;

Fig. 18 is a perspective view showing the principal frame work of the machine without certain auxiliary frame portions and without operating parts, to enable the construction and arrangement to be more readily understood;

Fig. 19 is a fragmentary schematic view similar to Fig. 16 showing a modified form of pneumatic circuit which may be employed in the operation of the machine, and Fig. 20 is an enlarged fragmentary detail view of a portion of the machine as shown in Fig. 1 showing the machine modified to accommodate the pneumatic circuit of Fig. 19.

GENERAL DESCRIPTION

Carton assembly in general

Figure 1:
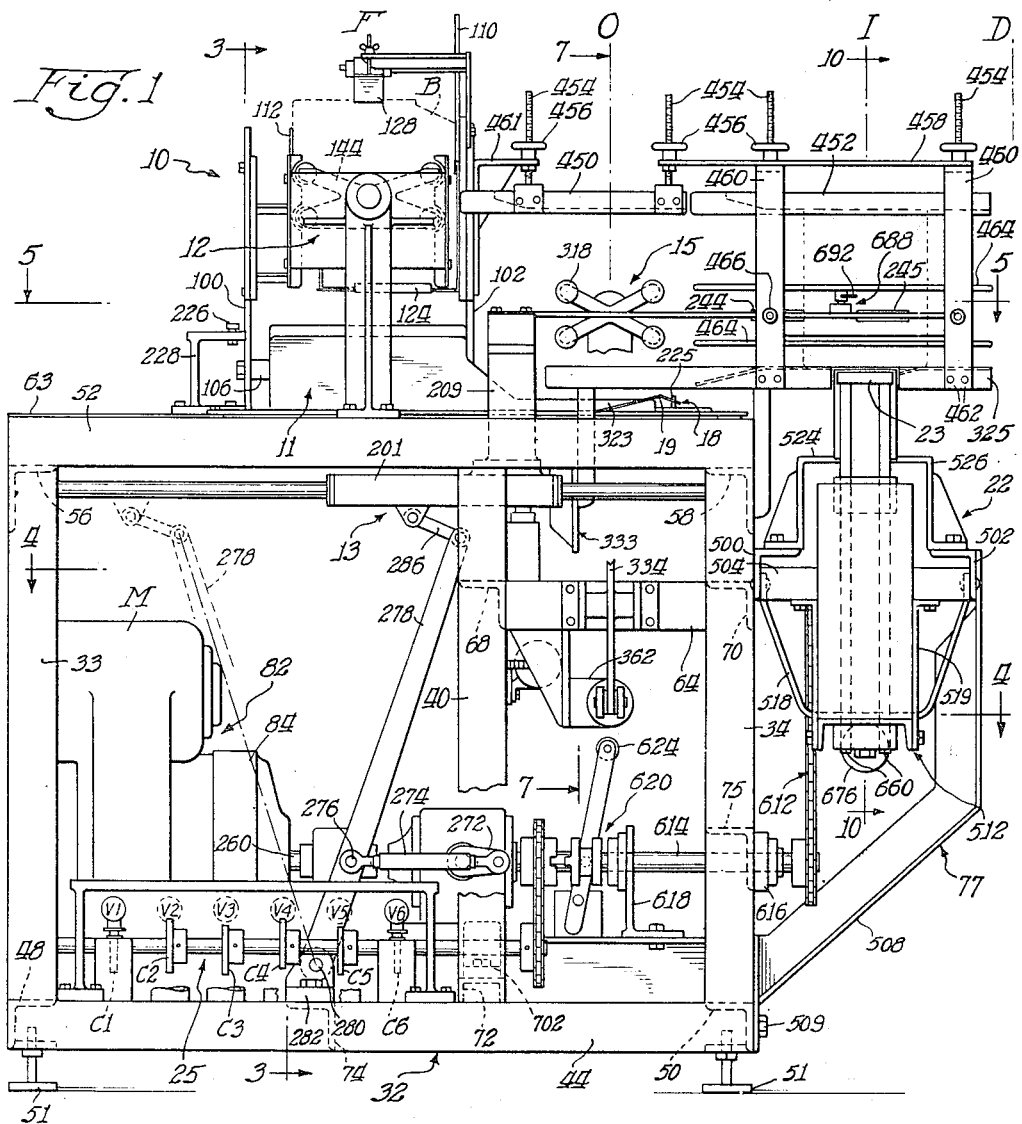
Fig. 1 is a front elevational view of a carton blank feeding, setting up and assembling machine constructed in accordance with the principles of the present invention.

Referring now to the drawings in detail and in particular to Fig. 11 wherein the functional operation of the machine in unfolding or squaring up a collapsed tubular paperboard carton shell or body and in squaring up or folding a partition blank and introducing the same by an inserting operation into the set up carton shell has been diagrammatically illustrated, one of the collapsed carton shells or bodies in the form of a folded blank B is shown in operative position at a feeding station F associated with the machine. A preceding set up or opened carton body or shell S is shown at an opening station O, while a prefolded partition insert P is shown in register with an opened carton shell S immediately prior to insertion thereinto at an inserting station I. The completely assembled or finished carton C, including the shell S and partition P, is shown in position at a discharge station D immediately prior to ejection thereof from the machine.

The present machine is capable of operating upon folded carton blanks of various forms, with or without partion inserts, as will be described presently. For illustrative purposes however, the machine has been shown in connection with the setting up and assembling of cartons from the folded blanks B and from the flat partition blanks shown at P in Fig. 11, these carton elements being received from the manufacturer in flat condition. The folded blanks B are such as to provide in the squared up shell S rigid major sides $a$ and $b$, foldable minor sides $c$ and $d$, a foldable slotted bottom $e$ and a multiple thickness, longitudinally extending medial partition wall $f$. The sides $c$ and $d$ are foldable along vertical fold lines $g$ and $h$ respectively so that the sections thereof are, in the collapsed condition of the carton, in face-to-face contact with the partition wall $f$. The bottom $e$ is foldable along a longitudinal fold line $i$ so that the sections thereof, when in collapsed condition, are in face-to-face contact. A pair of notches $k, k$ appearing in the collapsed carton, constitute slots, similarly designated, in the set up shell S for reception therein of the partition walls associated with the partition insert P.

The partition wall $f$ is formed with a small notch $m$ in its lower edge adjacent one end thereof. The notch $m$ is designed for interlocking engagement with a notch $n$ formed medially of an edge of the shell bottom $e$. The two notches $m$ and $n$ may be brought into such interlocking engagement by applying inward pressure to the wall $c$ of the shell to flex the same and thus displace the partition wall $f$ a slight distance so that the notch $m$ will clear the notch $n$ when the bottom wall $e$ is flexed upwardly to bring the notch $n$ into alignment or register with the notch $n$. Upon release of the inward pressure upon the shell side $c$ while the bottom $e$ is maintained flexed, the notch $n$ will be sprung into interlocking engagement with the notch $m$ and the pressure on the bottom wall $e$ may then be released.

The partition blank P is generally of rectangular form and includes a base panel $o$ and oppositely extending flaps $p$ and $q$, the latter being foldable at right angles to the plane of the base panel $o$ along fold lines $r$ and $s$ respectively. The outer ends of the flaps $p$ and $q$ are slotted as at $t$ for interlocking engagement with cooperating slots $u$ formed in the lower edge of the partition wall $f$.

From the above description it will be seen that after the carton shell blank B has been squared up into the shell S, the squared up or folded partition blank P may be inserted into the shell structure through the bottom thereof by inserting the partition flaps $p$ and $q$ through the slots $k$ in the bottom wall $e$ of the shell so that the slots $t$ straddle the base of the slots $u$ and vice versa to provide an erected and assembled carton C which is thus divided into six article-receiving compartments. If desired, the upper regions of the partition wall $f$ may be formed with finger openings $v$ for carrying purposes.

Brief description of the machine

The carton handling machine of the present invention has associated therewith the four previously mentioned operating stations, namely the feeding station F, the opening station O, the inserting station I, and the discharge station D. The collapsed cartons or folded blanks B are removed one at a time successively from the forward end of a magazine or feed stack assembly designated in its entirety at 10 (Figs. 1 and 3) and are deposited in flat condition in a horizontal trough-like guide channel 11 wherein the blanks are maintained in a vertical plane. Such transfer of the blanks B is effected under the control of a pneumatically operated pick-off or feed plunger mechanism 12.

The folded blanks are successively impelled under the influence of a combined reciprocating blank-impelling and shell impelling carriage assembly 13 in folded condition to the opening station O wherein the opposite major sides $a$ and $b$ thereof are simultaneously engaged by a pair of oppositely acting reciprocable vacuum plunger devices 14 and 15 (Figs. 1, 2, 7 and 8) which serve to pull these major sides of the collapsed carton shell outwardly and bodily away from each other and thus cause the carton shell to assume an approximately squared condition. With the carton shell in its approximately squared condition, the minor side $c$ thereof is operated upon by a side-engaging and flexing mechanism designated in its entirety at 16 (Figs. 8, 9 and 11) having an oscillatory flexing finger 17 designed to engage the carton shell side $c$ and flex the medial regions thereof slightly beyond their normal plane while at the same time flexing the outer minor carton shell side $d$ outwardly due to the end thrust imparted thereto by the rigid partition wall $f$. Such distortion of the carton shell and consequent endwise movement of the partition wall $f$ will cause the notch $m$ formed in the latter wall to move outwardly beyond the vertical plane formerly occupied by the side wall $d$. While the carton shell remains thus distorted, the bottom $e$ is operated upon by a second flexing mechanism designated in its entirety at 18 and including a pair of flexing fingers 19 to flex the bottom upwardly as indicated in Fig. 12 to bring the notches $m$ and $n$ into register, after which the inward pressure on the side wall c is relieved so that the two notches snap into interlocking relationship to maintain the carton shell S as a whole in its set up condition.

After the carton shell has thus been set up, it is again impelled by the reciprocating carriage assembly 13 and delivered to the inserting station I wherein a prefolded partition member or insert P is assembled in the shell by the insertion of the partition flaps p and q through the slots k provided in the shell bottom e. The flat blanks from which the partition members P are formed are withdrawn one at a time successively from a stack of such blanks maintained in a magazine 20 (Fig. 10) associated with a blank feeding and folding mechanism 21 disposed adjacent the inserting station I. The withdrawn blanks are impelled by the feeding and folding mechanism toward the inserting station I and during such movement they are progressively folded so that upon arrival at the inserting station they will be completely folded or squared up and in register with the slots k provided for them in the bottom e of a carton shell S positioned at the inserting station. Upon arrival of the inserts or partition members P at the inserting station, they are moved upwardly and introduced into the shell S by means of an inserting mechanism 22 including a reciprocable inserting ram head 23 which moves the partition members to their final position within the shell.

The thus assembled cartons C are finally impelled under the influence of the reciprocable carriage assembly 13 and are conducted to the discharge station D from whence they are pushed from the machine by the impelling force of the next proceeding carton.

Figure 4:
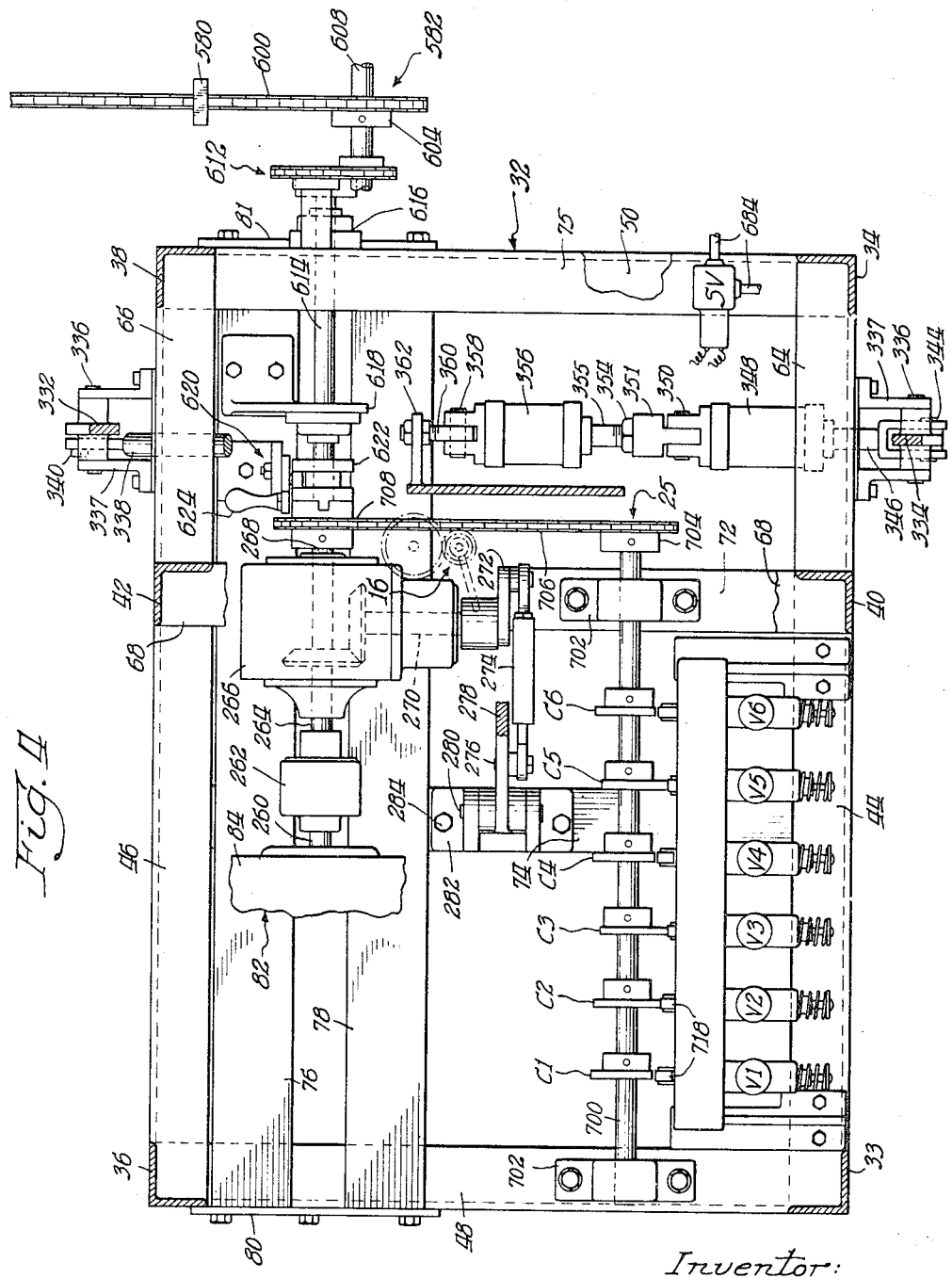
Fig. 4 is a horizontal sectional view taken substantially along line 4—4 of Fig. 1.
Figure 16:
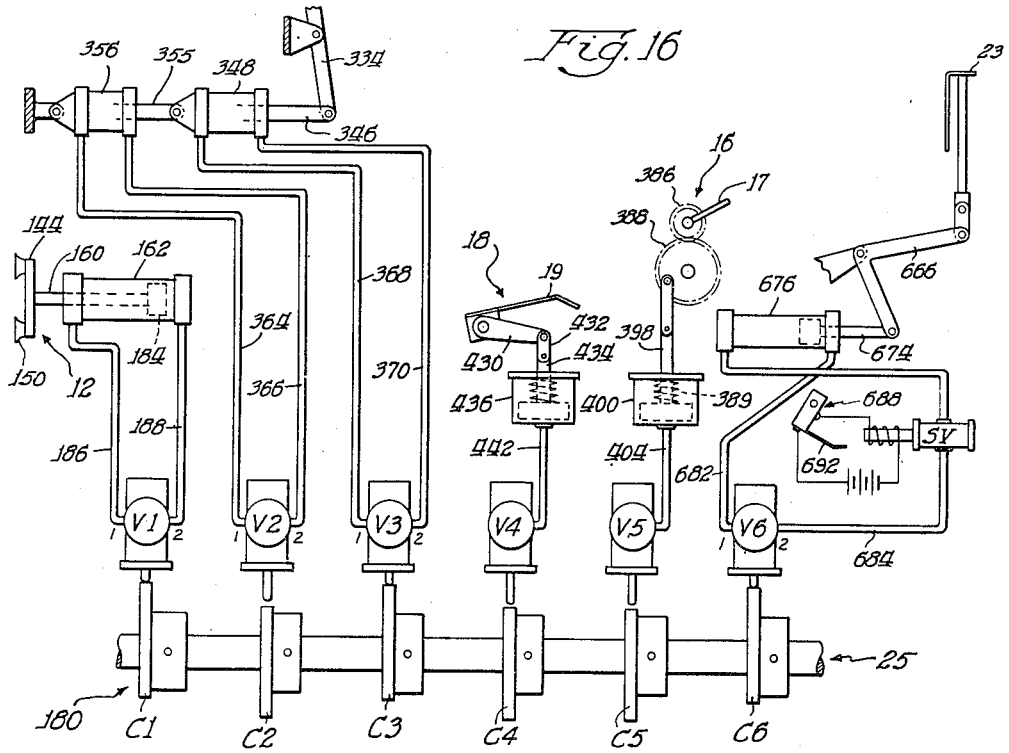
Fig. 16 is a schematic view illustrating certain pneumatic circuits employed in connection with the invention, together with the cam control mechanism and the electric control mechanism by means of which the pneumatic circuits are selectively rendered effective to control the operative machine instrumentalities.

The machine is driven by an electric motor M and is operated under the control of a series of cams C1, C2, C3, C4, C5 and C6 associated with the timer control mechanism 25 (Figs. 1, 4 and 16).

THE MACHINE FRAMEWORK

Figure 2:
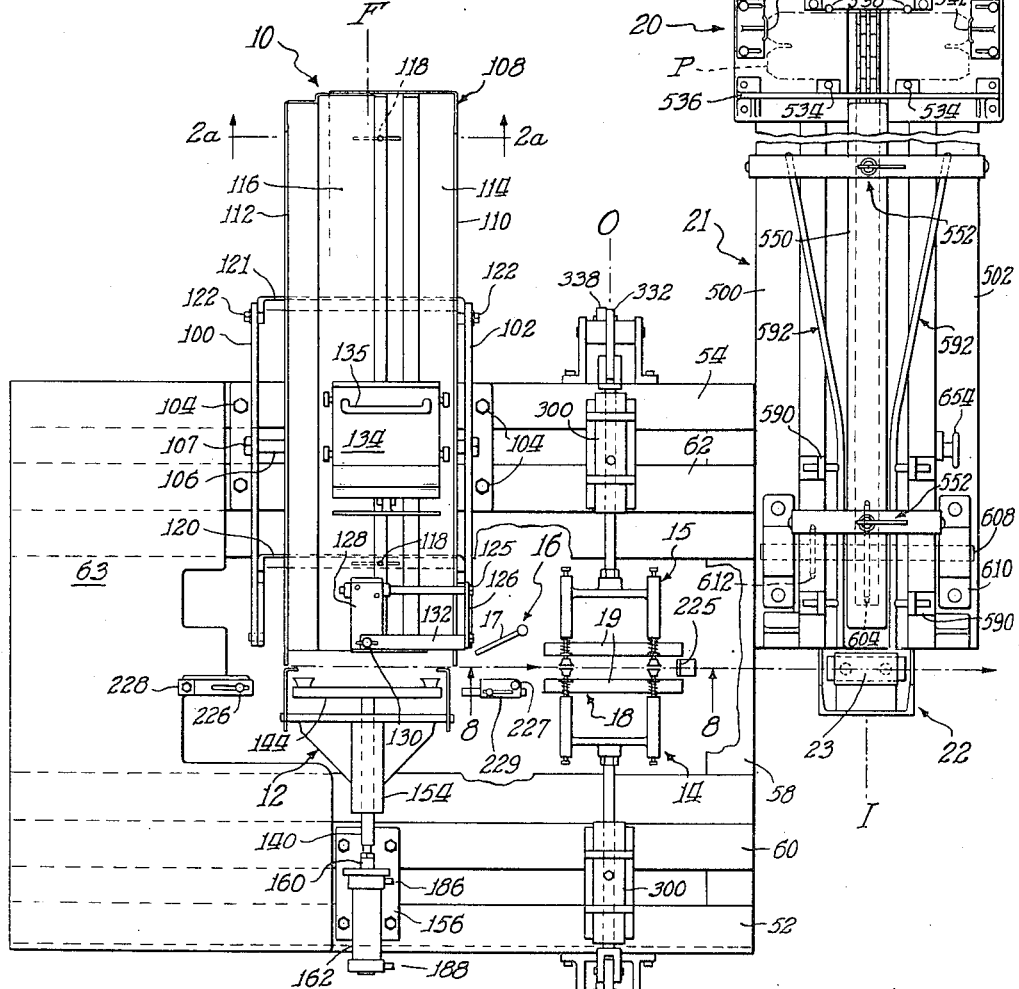
Fig. 2 is a top plan view of the machine shown in Fig. 1.
Figure 3:
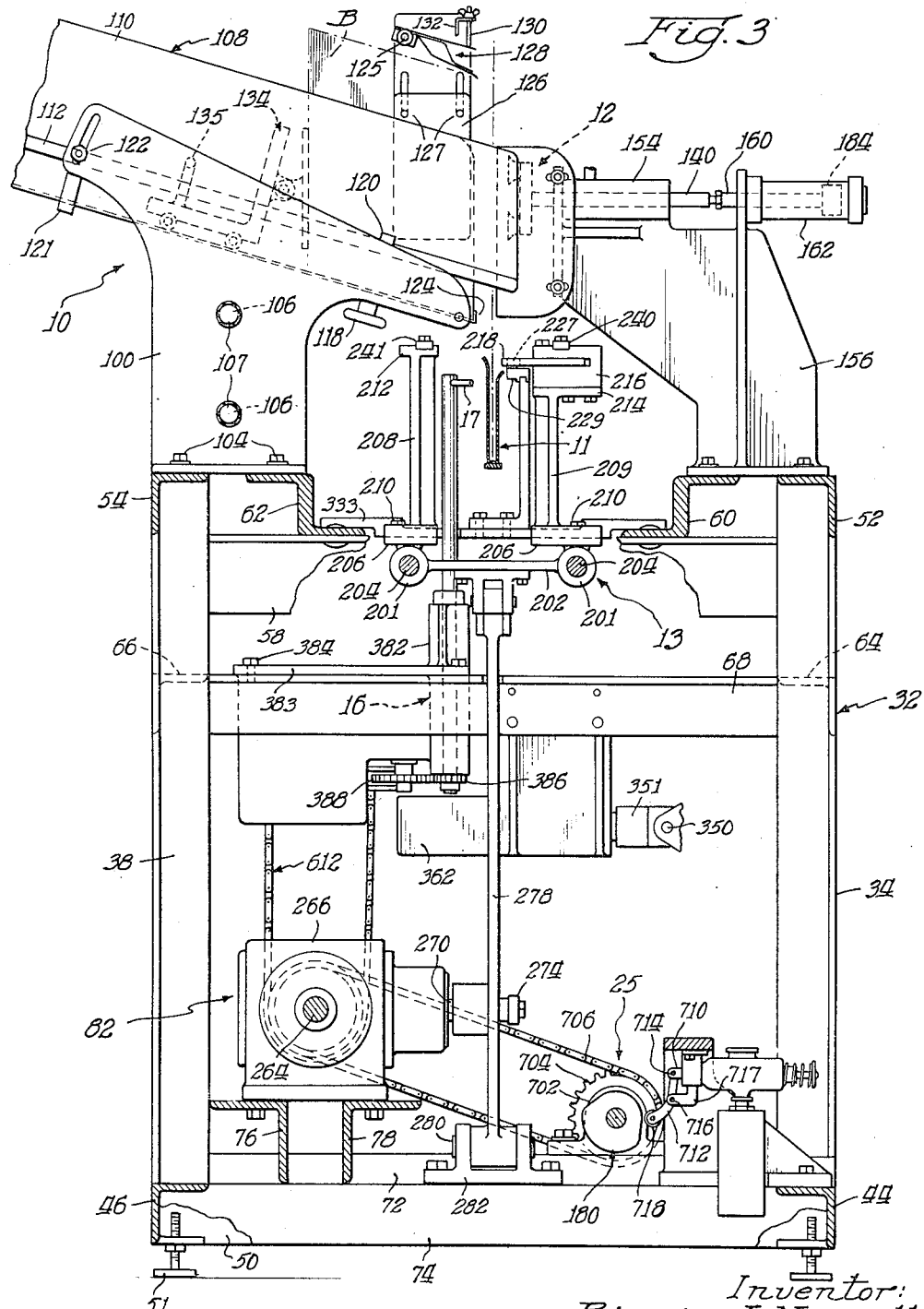
Fig. 3 is a vertical sectional view with some parts removed, taken substantially along line 3—3 of Fig. 1.

Referring now to the drawings in detail and in particular to Figs. 1 to 5 inclusive and 18, the carton setting up and assembling machine involves in its general organization a stationary framework 32 which is generally of over-all rectangular configuration and consists of structural members and suitably welded together to provide an open sided box-like structure including vertical front corner posts 33 and 34, vertical rear corner posts 36 and 38, and vertical front and rear intermediate posts 40 and 42 respectively. The vertical posts 33, 34, 36, 38, 40 and 42 are carried at their lower ends on a closed horizontal rectangular frame including front and rear members 44 and 46 respectively, and side members 48 and 50. The supporting frame just described, and consequently the entire framework 32, is supported from the floor by means of adjustable leveling feet 51. A front upper cross member 52 (Figs. 1 and 3) extends transversely across the upper ends of the front members 33, 40 and 34 and a similar rear cross member 54 extends across the upper ends of the vertical rear members 36, 42 and 38. A pair of side members 56 and 58 (Fig. 1) extend between the front and rear corner posts 33 and 36, and 34 and 38 respectively a short distance below the upper ends thereof and serve to support thereon spaced inner front and rear transverse beam members 60 and 62 (Figs. 3 and 5). A flat plate 63 overlies the left hand region of the framework 32, as viewed in Fig. 2, and affords a convenient table surface at this side of the machine.

At the right hand side of the machine, as viewed in Figs. 1 and 4, an open rectangular frame-like structure including front and rear transverse members 64 and 66 and longitudinal members 68 and 70 is carried by the four vertical posts 34, 38, 40 and 42 and constitutes, in effect, an elevated shelf or platform for supporting certain of the operative machine instrumentalities.

A longitudinally extending member 72 (Figs. 1 and 3) extends between the vertical members 40 and 42 adjacent the bottom thereof. A longitudinal member 75 (Figs. 1 and 4) bridges the distance between the front and rear corner posts 34 and 38. An auxiliary frame structure, designated in its entirety at 77 at the right hand side of Fig. 1, serves to support the mechanism associated with the partition blank feeding and folding mechanism 21 disposed at the inserting station I.

Referring now to Figs. 3 and 4, a pair of spaced angle members 76 and 78 extend across the rear of the machine framework 32 adjacent the bottom thereof and are carried at their ends by end plates 80 and 81 bolted or otherwise secured to the members 48 and 50. The members 76 and 78 constitute a support for a power unit designated in its entirety at 82 and including the motor M and a gear reduction device 84 (Fig. 1).

CARTON SHELL FEEDING MECHANISM

The feed magazine

Referring now to Figs. 1, 2, 2a and 3, the storage magazine 10 for the carton shell blanks B involves in its general organization a pair of spaced side plates or standards 100 and 102, bolted or otherwise secured as at 104 to the transverse members 54 and 62 adjacent the left hand end of the machine as viewed in Fig. 1. A pair of transverse tie rods 106 extend between the standards 100 and 102 and are anchored in position by means of studs 107. The standards 100 and 102 serve to support therebetween an inclined chute 108 in the form of a sectional trough which is adjustable both as to its inclination and its width. The chute 108 (see Fig. 2a) includes a side 110 of substantial height and a side 112 of lesser height affording convenient access to the contents of the magazine for loading purposes. To permit adjustment of the chute for width, it is preferably formed in two sections, each section including one of the chute sides together with a bottom section. The bottom sections shown at 114 and 116 overlap each other and provide a composite chute bottom. Manually operable clamping bolt assemblies 118 (see Fig. 2) serve to secure the chute sections in any desired position of adjustment.

The chute 108 is inclined forwardly and downwardly and is adjustably supported at its forward end region in a cradle 120 (see Fig. 2) extending between the standards 100 and 102 and is supported adjacent its rear end region in a cradle 121, the ends of which are adjustably secured to the standards by pin and slot connections 122.

The forward end of the chute 108 terminates adjacent the vertical plane of the tough-like carton shell guide 11 (Fig. 3) and a short lip 124 is provided at the front end of the chute to retain the foremost blank B in the stack in position to be operated upon by the pick-off or feed plunger mechanism 12. A stud 125 carried on a bracket 126 adjustably secured by pin and slot connections 127 to the standard 102 overlies the forward end of the chute above the stack of blanks B and carries a pivoted spring cluster 128 adapted to engage and releasably restrain the upper edge of the foremost blank B in the stack while permitting successive blanks to be withdrawn under the influence of the vacuum plunger mechanism 12. An adjustable pin 130 mounted on an angle piece 132 carried on the bracket 126 constitutes a limit stop for the spring cluster 128.

At the rear end of the chute 108 a guided pressure plate assembly 134 rests on the chute bottom and serves by its inherent weight to urge the stack of blanks B forwardly along the chute toward the pick-off plunger mechanism 12. A handle 135 associated with the pressure plate assembly forms a convenient means for manipulation of the latter in reloading the feed magazine 10.

Pick-off plunger assembly

The pick-off or feed plunger assembly 12 comprises a pneumatically reciprocable plunger proper including a plunger stem 140 provided with a yoke-like structure at its outer end comprising diverging yoke arms 144. The stem 140 is formed with a central bore 146 (Fig. 13)

which communicates through passages 148 with a series of vacuum cups 150 carried at the outer ends of the yoke arms 144. The bore 146 is vented to the atmosphere by means of a vent opening 152 adjacent the rear end of the plunger stem 140. The plunger stem 140 is slidably carried in a sleeve or cylinder 154 positioned at the upper end of a supporting bracket 156 secured at its lower end to frame members 52 and 60. The opposite ends of the stem 140 project outwardly from the cylinder 154, the forward end carrying the yoke 142, as previously stated, and the rear end being operatively connected as at 158 to the operating plunger 160 of a pneumatically operated cylinder 162 mounted at the upper end of the bracket 156 in alignment with the cylinder 154. The stem 140 is maintained spaced from the wall of the cylinder 154 by a pair of bushings 163. The bore 146 communicates through a passage 164 with the interior of the cylinder 154 which is adapted at all times to be connected to a source of reduced pressure through a vacuum conduit 166.

The plunger assembly just described is movable from a forward or advanced position, wherein the suction cups 150 engage the foremost carton shell blank B in the stack contained within the magazine 10, to a retracted position wherein the withdrawn blank is vertically aligned with the trough-like guide channel 11. When the plunger stem 140 is in its advanced position with the suction cups 150 in engagement with the foremost carton shell blank B in the magazine 10, the vent opening 152 is withdrawn into the cylinder 154 and reduced pressure is applied to the suction cups 150 through the passages 164, 146 and 148. As the stem 140 moves toward its fully retracted position, the vent 152 moves out of the cylinder, thus bleeding the various passages to atmosphere. Such exposure of the vent 152 takes place precisely at the moment when the carton shell blank becomes vertically aligned with the trough-like guide channel 11 and thus the blank will fall under the influence of gravity so that the lower edge portions thereof will be received between the side walls of the guide channel in a manner and for a purpose that will be made clear presently.

*The pick-off plunger operating mechanism*

The movements of the plunger stem 140 are controlled by the corresponding movements of the operating plunger 160 and the movements of this latter plunger are, in turn, controlled under the influence of a timing cam 179 associated with a timing cam cluster 180 (Figs. 4 and 16), the details of which will be described when the timing mechanism 25 for the machine as a whole is considered. At this point it is deemed sufficient to state that the cylinder 162 has slidably dipsosed therein a piston 184 (Figs. 3 and 16) attached to the plunger 160. A pair of air lines 186 and 188 connect the opposite ends of the cylinder 162 with a valve 71 associated with the timing mechanism 25 and operable under the control of the cam C1. The cam C1 and valve V1 are so designed according to engineering exigencies that at predetermined points in the machine cycle, air is admitted alternately to the opposite ends of the cylinder 162 to move the plunger 160 in opposite directions and control the movements of the pick-off or feed plunger assembly 12 and repeatedly withdraw the foremost blank B from the forward end of the magazine 10 to deposit the same in the guide channel 11.

THE RECIPROCABLE BLANK AND CARTON SHELL IMPELLING CARRIAGE

*The carriage proper*

Carton shell blanks B withdrawn from the magazine 10 and deposited in the guide channel 11 by the pick-off mechanism just described are adapted to be impelled immediately under the influence of the reciprocable carriage assembly 13 to the opening station O. The carriage assembly 13 includes a carriage proper in the form of a casting (Figs. 1, 3 and 5) having a pair of spaced sleeve portions 201 and a connecting web portion 202. The carriage is slidably supported on a pair of transversely extending elongated spaced horizontal guide rods 204, the ends of which are anchored in brackets 205 carried by the upper side frame members 56 and 58. The sleeve portions 201 of the carriage are formed with enlarged upwardly extending portions 206 (Fig. 3) providing supports for a pair of upstanding brackets 208 and 209 which are adjustably secured by bolts 210 to the supports 206. The upper ends of the brackets 208 and 209 are formed with shelf portions or platforms 212 and 214 respectively. The shelf portion 214 is also shown in Fig. 6.

Supported upon the shelf portion 214 (Figs. 1, 3 and 6) of the bracket 209 is a block 216 which carries an oscillatory blank-impelling finger 218. The finger 218 is formed on a flat plate 219 which is disposed within a horizontal slot 220 formed in the block 216 and which is pivoted for oscillating movement within the slot by means of a stud 221 passing through the plate 220. A pair of recesses 222 and 223 provided in the underneath side of the plate 200 cooperate with a spring pressed detent ball 224 in maintaining the plate in either of two extreme positions. When the detent 224 is in position within the recess 223, as shown in Figs. 5 and 6, the plate 219 will assume a position wherein the finger 218 is projected outwardly from the slot 220 beyond the center line of the guide channel 11 so that as the carriage assembly 13 is moved from its extreme left hand position as viewed in Fig. 5, toward the right, the finger 218 will engage the edge of a blank disposed in the guide channel to impel the blank toward the opening station O. An adjustable stop member 225 (see Figs. 1, 2 and 5) positioned in the path of the blank limits the movement of the latter and insures alignment of the blank with the opening mechanism at the opening station. When the detent 224 is in position within the recess 222, the plate 219 will assume a position wherein the finger 218 is partially retracted within the slot 220 so that the end thereof will clear the path of movement of the oncoming blank within the guide channel 11 during return movement of the carriage assembly.

*The blank impelling finger mechanism*

As best seen in Fig. 5, a pair of stationary but adjustable finger-operating abutments 226 and 227 are carried on brackets 228 and 229 respectively (see also Figs. 1, 2 and 3) adjustably secured to the machine framework. It will be seen therefore that when the carriage assembly 13 approaches its extreme left hand position as viewed in Fig. 5, the finger 218 will strike the abutment 226 and become moved thereby to its fully extended position. Similarly, as the carriage assembly 13 approaches its right hand position, the abutment 227 will engage the finger 218 and move the same to its retracted position out of the path of movement of the blanks B.

*The impelling mechanism for open cartons*

The carriage assembly 13 further includes mechanism for impelling the carton shells S which become squared up at the opening station O and conducting them in opened condition to the partition inserting station I. This impelling mechanism consists of a pair of longitudinally extending arms 240 and 241 (Figs. 1, 3 and 5), the former being bolted as at 242 to the upper face of the block 216 and the latter being bolted as at 243 to the shelf portion 212 of the bracket 208.

As best illustrated in Fig. 5, each of the arms 240 and 241 has pivotally secured thereto an impelling finger 244, each located at longitudinally aligned medial positions along the respective arms. A second pair of impelling fingers 245, likewise longitudinally aligned, are carried by the arms 240 and 241 at positions on the arms further removed toward the distal ends thereof. Each of the fingers 244 and 245 is spring pressed inwardly of the arms 240 and 241 by means of coil springs 246. The function of the impelling fingers and their mode of operation will be set forth after a description of the carton shell blank opening mechanism at the opening station O has been given.

The carriage reciprocating mechanism

The carriage, comprising the spaced sleeves 201 and connecting web 202, is adapted to be reciprocated through a train of mechanism leading from the motor driven gear reduction mechanism 84 associated with the power unit 82. Accordingly, the output shaft 260 of the mechanism 82 (Figs. 1 and 4) is connected through a slip clutch device 262 to the driving shaft 264 of a conventional dual output spiral gear device 266 having an output shaft 268 in alignment with the shaft 264 and a second output shaft 270 extending at right angles to the shafts 264 and 268. A one-to-one gear ratio obtains through the mechanism from the drive shaft to each of the driven shafts thereof. The output shaft 270 has mounted thereon a crank arm 272, the outer end of which is connected through a link 274 to a pin 276 carried medially on an elongated rocker arm 278 pivoted at its lower end as at 280 to a bracket 282 supported on the transverse frame member 74 and secured thereto by means of bolts 284. The upper end of the arm is operatively connected through a link 286 to the carriage.

From the above description it will be seen that rotary motion of the output shaft 260 is translated into reciprocal movement of the carriage through the train of mechanism including the spiral gear device 262, crank arm 272 and linkage devices 274, 278 and 286.

THE CARTON OPENING MECHANISM

The opening plunger assemblies

Referring to Figs. 1, 2 and 7, the previously mentioned opening plunger assemblies 14 and 15 are each similar in many respects to the pick-off or feed plunger assembly 12 and it is thought that the description previously made in connection with the former device 12 will in a large measure suffice for the latter devices 14 and 15. The plunger assemblies 14 and 15 are arranged in opposition as shown in Figs. 2 and 7 and each assembly includes a vacuum cylinder 300 (see also Fig. 13) and plunger stem 302 substantially identical in construction and operation to the vacuum cylinder 154 and plunger 140 associated with the feed plunger assembly 12. The plunger 302 of each assembly 14 and 15 carries a yoke 304 (see also Fig. 9) having yoke arms 306 formed with channels 308 and having boss-like sleeves 310 at their outer ends. Each sleeve 310 slidably carries a hollow tubular finger 312, the bore 314 of which is in constant communication with the interior of the sleeve through a port 316. The interior of the sleeve is in communication with the channel 308 and the latter, in turn, communicates with the bore 317 of the plunger stem 302. The bore 317 is formed with a vent opening 319 which functions in the manner of the vent opening 152 previously described in connection with the feed plunger mechanism 12. Suction cups 318 are provided at the outer ends of the fingers 312 and a series of springs 320 serve to normally urge the fingers 312 outwardly of the sleeves 310 into carton shell engaging position. A flexible air line 322 connects each cylinder 300 with a source of reduced pressure.

The plunger stems 302 are movable in unison in opposite directions from advanced positions wherein the suction cups 318 of the two plunger assemblies are in close proximity to each other and wherein they may engage the opposite major sides a and b of the carton shell blank B at the opening station O, to intermediate positions indicated in broken lines and labelled R in Fig. 7. The stems 302 are also movable from their intermediate positions to fully retracted positions shown in broken lines and labelled R1. During movement of the stems 302 from their advanced to their intermediate positions, the major sides of the carton shell blank B are pulled apart by the action of the suction cups 318 and the blank is thus brought to a fully expanded and squared up condition. As will be made clear when the description of the timing mechanism of Fig. 16 is given, a dwell period exists in the machine cycle wherein the plungers 312 remain in their intermediate positions to permit automatic locking of the notch n formed in one edge of the shell bottom e with the partition wall notch m under the influence of the flexing mechanisms 16 and 18. The additional movement of the plunger stems 302 wherein they move to their fully retracted positions is provided for in order that the suction cups 318 will move outwardly a slight distance to afford a clearance between the cups and the squared up carton shell sides so that the shells may proceed to the inserting station R. It should be noted that upon movement of the plunger stems 302 to their fully retracted positions, the vent openings 319 move outside the confines of the cylinder 300 and communicate with the atmosphere to relieve the reduced pressure within the cylinders and allow the suction cups 318 to release the carton shell sides.

The supporting means for the opened cartons

Referring to Figs. 1, 5, 7, 8 and 9, and in particular to Figs. 5, 8 and 9, the blanks B which move from the feeding station F to the opening station O travel in a shallow trough-like extension 323 of the blank guide 11 and come to rest against the stop member 225 as previously described. During the opening operation at the opening station O, when the major sides a and b of the blank S are pulled apart under the influence of the vacuum cups 318, the bottom wall c is unfolded so that the fully opened shell bottom assumes a planar condition above the level of the guide extension 323 so that it overlies a pair of extensions 324 (Figs. 8 and 9) provided on an elevated feed table 325 extending transversely from the opening station O through the inserting station I to the discharge station D. The table 325 is in the form of a plate one end of which is supported on a bracket 326 bolted as at 327 to the side member 58. The other end of the table 325 is carried by a pair of arms or supports 328 bolted as at 329 to a depending web 331 formed on a longitudinal supporting member 333 extending between the frame members 60 and 62. A ramp portion 335 formed on the table 325 guides the front bottom edges of the shells S toward the inserting station I. Upon release of the vacuum pressure at the vacuum cups 318, the expanded carton shell S is released and the bottom thereof rests upon the extensions 324 of the table 325 for subsequent movement therealong toward the inserting station under the influence of the fingers 244.

The plunger reciprocating mechanism

Referring to Fig. 7 wherein the mechanism for reciprocating the plunger assemblies 14 and 15 in opposite directions respectively is best illustrated, the rear ends of the plunger stems 302 are pivotally connected as at 330 to the upper end of a pair of elongated oscillatory levers 332 and 334 respectively. The levers are pivoted medially of their ends as at 336 to respective brackets 337 suitably secured to the machine framework 32. A longitudinal tie rod 338 extends between the lever members 332 and 334 and is pivoted at its rear end as at 340 to the extreme lower end of the lever 332 below the pivotal axis 336 thereof. The forward end of the rod 338 is pivoted to the lever 334 at a medial point 342 above the pivotal point 336 thereof. The distance between the pivot points 340 and 336 along the lever 332 is equal to the distance between the pivot points 342 and 336 along the lever 334 so that the extent of "throw" of the two levers will be precisely equal to insure identical increments of movement of the two plungers 312 associated with the cylinders 300.

The lower end of the lever 334 is pivoted as at 344 to the forward end of a plunger 346 of a floating air cylinder 348 (see also Fig. 1). The rear end of the cylinder 348 is pivotally connected by a pin 350 to a coupling member 351 and the latter is adjustably secured as at 354 to the forward end of a plunger 355 associated with a second air cylinder 356 pivotally secured as at 358 to an eye bolt 360 secured in a bracket 362 supported from the longitudinal frame member 68. The two cylinders 348 and 356 may thus be said to be arranged in tandem. The opposite ends of the cylinders 356 and 348 respectively are connected by air lines 364, 366 and 368, 370 to respective control valves V2 and V3 associated with the control mechanism of Fig. 17.

THE CARTON SHELL SIDE FLEXING MECHANISM

Referring to Figs. 8 and 9 wherein the carton side flexing mechanism 16 is best illustrated, the previously mentioned flexing finger 17 is engageable with the minor side c of the squared up carton shell S at the opening station O to flex the carton shell preparatory to the locking operation thereof as previously described. Accordingly, the finger 17 is carried at the upper end of an oscillatory rod 380 mounted in a sleeve 382 integrally formed with an anchoring plate 383 secured as at 384 (see also Fig. 3) to the longitudinal frame member 68. A pair of collars 385 prevent vertical shifting of the rod 380 in the sleeve 382.

The lower end of the rod 380 has fixedly mounted thereon a small gear 386 (Figs. 3, 8 and 9) which meshes with a larger gear 388 spring-biased at 389 and rotatably carried by a web 390 formed on the bracket plate 383. The gear 388 carries a pin 392, and a link 394 pivoted at one end to the pin 392 has its other end pivoted as at 396 to the forward projecting end of a plunger 398 connected to a piston 399 associated with a cylinder 400 bolted as at 402 to the plate 382. The cylinder 400 has one end thereof operatively connected by air line 404 to the valve V5 which is operable under the control of the cam control mechanism 25 (Fig. 17) in a manner that will be set forth subsequently.

THE CARTON BOTTOM FLEXING MECHANISM

Still referring to Figs. 8 and 9, the flexing fingers 19, 19 associated with the carton shell bottom flexing mechanism 18 are adapted to engage the shell bottom e to flex the same and position the notch n thereof in register with the notch m at the lower end of the partition wall f for subsequent interlocking engagement with the latter. The fingers 19 are carried in blocks 419 mounted on a rock shaft 420 pivoted in a pair of brackets 422 secured as at 424 to the longitudinally extending bar 333 which in turn is secured as at 428 at its ends to the transversely extending frame members 60 and 62. A crank arm 430 secured to the rock shaft 420 has its distal end pivoted to one end of a link 432 and the other end of the link is pivoted to the free projecting end of a plunger 434 connected to the piston 435 of a cylinder 436 bolted as at 438 to the depending web 331 formed on the transverse supporting member 333. The piston 435 is spring pressed as at 439 to bias the piston to its lowermost position in the cylinder 436. The lower end of the cylinder 436 is connected through an air line 442 to the valve V4 and the latter is operable under the control of the cam control mechanism of Fig. 16 in a manner to be made clear presently.

From the above description it will be seen that with the piston 435 in its lowermost position, as shown in Fig. 8, the carton shell bottom engaging fingers 19, 19 will assume lowered retracted positions below the level of a squared up carton shell S positioned at the opening station O. Upon admission of air under pressure to the cylinder 436, the piston 435 will be moved upwardly therein to actuate the fingers 19 through the train of linkage mechanism 432, 430, to elevate the fingers into engagement with the bottom e of the carton shell to flex the same inwardly of the shell for locking purposes as previously described.

THE CARTON SHELL BLANK GUIDING MEANS

In order to guide the extreme upper edges of the carton shell blanks B during movement of the blanks from the feeding station F to the opening station O and to guide the upper projecting edge portion of the central partition wall f of the opened carton shell during movement of the latter from the opening station to the inserting station I, an elevated sectional guide channel is provided including inverted channel members 450 and 452 in alignment (Fig. 1). The members 450 and 452 are adjustable as to height and, accordingly, they are suspended by four threaded rods 454 which pass through adjusting knobs 456 three of which are rotatably supported in a strap 458 centrally mounted on a pair of inverted U-shaped arbors 460 secured as at 462 to the sides of the guide table 325. The other adjusting knob 456 is rotatably carried in a bracket 461 mounted on the magazine standard 102. A plurality of guide rods 464 having flared ends 465 are adjustably supported as at 466 on the arbors 460 and, in combination with the table 325, provide a guide path for the squared up carton shells S in moving from the opening station to the inserting station and from this latter station to the discharge station.

THE PARTITION BLANK FEEDING AND FOLDING MECHANISM

The auxiliary framework

The partition blank feeding and folding mechanism 21 is best illustrated in Figs. 1, 2, 10, 14 and 15 and is fragmentarily and schematically illustrated in Fig. 11. Referring to these views, the auxiliary framework 77 which supports the feeding and folding mechanism 21 as well as the inserting mechanism 22 involves in its general organization a generally rectangular horizontal frame including longitudinally extending members 500 and 502, and front and rear transverse members 504 and 506 respectively. The frame member 500 is suitably secured to the longitudinal frame member 70 of the framework 32 and the frame member 502 is supported by an angular frame piece or strut 508 bolted as at 509 to the lower longitudinal side member 50 of the framework 32. A standard 510 extends from the floor or supporting surface and provides a support for a cross member 511 extending between the frame members 500 and 502. As shown in Fig. 10, an L-shaped cradle 512 having a vertical front member 514 and a horizontal cradle bottom 516 is suspended by means of relatively heavy straps or supports 518 and 519 from the frame sides 500 and 502.

Supported by means of straps 520 slightly above the level of the frame 500, 502, 504, 506 is a partition blank feed platform 522 consisting of longitudinally extending angle pieces 524 and 526 which are connected adjacent their rear ends by a cross piece 528. A plate 530, supported by straps at the level of the platform 522 constitutes a wide extension of the later and also constitutes a bottom wall for the partition blank feed magazine 20.

The feed stack magazine

The partition magazine 20 includes the previously mentioned bottom 530 (Figs. 2, 10 and 14), a pair of vertical front guide posts 534 the upper ends of which are supported in a transversely extending standard or bracket 536, a similar pair of read guide posts 538 similarly supported in a standard or bracket 540, and a pair of side posts or guides 542. The lower ends of the front guide posts 534 are spaced a slight distance above the level of the plate 530 and guide platform 522 to provide a gate or clearance opening to permit successive feeding of the lowermost blank in the stack forwardly along the platform 522 toward the inserting station I. A weight in the form of a plate 544 having a handle 546 is provided to rest upon the stack of blanks P to facilitate feeding of the blanks from the stack.

The blank guiding and folding mechanism

Still referring to Figs. 2, 10 and 14, and in addition to Fig. 15, a longitudinally etxending, centrally located adjustable guide bar 550 overlies the platform 522 and is substantially coextensive therewith. The guide bar 550 is adapted to be maintained spaced above the level of the platform 522 and is capable of vertical adjustment to accommodate the passage of blanks P of varying thickness therebeneath and along the surface of the platform 522. The adjusting mechanism employed for this purpose is in the form of a pair of quick release suspension devices, both designated at 552 whereby either or both ends of the bar may be instantly released from their adjusted positions in the event of a jam along the feed line of the blanks P. The suspension devices 552 are identical in construction and therefore a description of one of them will suffice for both.

Each suspension device 552 includes an inverted U-shaped arbor or support 554 (Fig. 14) the ends of which are bolted as at 556 to the frame members 500 and 502, the two supports 554 being located adjacent the feed magazine 20 and inserting station R respectively. Threadedly received in an opening 558 provided centrally of the support 554 in a tubular nipple 560 having a vertical bore 562 extending therethrough and in which there is slidably disposed a suspension rod 564. The lower end of the suspension rod 564 is threadedly received and clamped as at 566 in an opening 568, formed in the guide bar 550 along the central longitudinal axis thereof. A coil spring 570 surounding the rod 564 bears at its lower end against a washer 572 and at its upper end against the nipple 560 and serves normally to urge the bar 550 downwardly toward the platform 522. The upper end of the rod 564 is bifurcated as at 572 and a pin 574 extending across the slot has mounted thereon an enlarged cam head 576 formed on a lever 578. The lever 578, when in its horizontal full line position shown in Fig. 14 serves to maintain the guide bar 550 in an adjusted position slightly above the level of the platform 522 with the spring 570 under compression. When the lever is moved to the broken line vertical position shown in this view, a flat surface provided on the cam head 576 moves into position in register with the upper face of the nipple 560 and, because of its relatively great eccentricity with respect to the pivotal axis of the pin 574, the rod 564 together with the guide bar 550 will be raised to an extent sufficient to enable the operator to clear the guide path for the blanks P of any jam which may have occurred.

Blanks P contained in the feed magazine 20 are adapted to be withdrawn successively from the bottom of the stack of blanks and introduced into the space existing between the lower face of the guide bar 550 and the upper face of the platform 522 and impelled in a forward direction, that is, from the magazine toward the inserting station I. The impelling means for the various blanks P will be described in detail subsequently but for the present it is deemed sufficient to state that this impelling means is in the form of a picker mechanism including a series of picker members 580 associated with an endless conveyor assembly 582, the picker members being adapted to move orbitally in an endless path of movement having a straightaway portion which carries the picker elements beneath the stack of blanks and along the underneath surface of the guide bar 550.

The base panel o of the partition blanks P are adapted to pass directly beneath the guide bar 550 while the flap portions p and q overlie the side regions of the platform 522 and project laterally beyond the outer longitudinal edges of the angle pieces 524 and 526 which make up the feed platform 522. Adjustably supported in brackets 590 mounted on the angle pieces 524 and 526 are a pair of guide rails 592 having horizontal portions 594 and rearwardly and downwardly inclined portions 596 and the extreme rear ends 598 of which terminate slightly below the level of the platform 522. The guide rails are adjustable toward and away from each other to accommodate the formation of folded partition members P of varying widths and each rail extends from a position somewhat forwardly of the feed magazine to the inserting station. As each flat partition blank leaves the feed magazine and moves progressively and bodily forwardly along the platform 522 toward the inserting station I, the forward or leading edges of the partion flaps p and q will engage the rearwardly and downwardly inclined portions 596 of the guide rails 592 and ride upwardly thereon. The base portion o of the blank being confined between the upper surface of the platform, but the flaps p and q being unrestricted, will gradually be folded upwardly relative to the base portion o until such time as the flaps enter the space between the opposed horizontal portions 594 of the guide rails 592, at which time these flaps will be positioned vertically and extend normal to the base panel o so that a substantially rectangular partition structure will have been created by the folding process.

The partition blank impelling picker mechanism

Still referring to Figs. 2, 10, 14 and 15, the previously mentioned picker members 580 are preferably four in number and are carried at equally spaced points on an endless conveyor chain 600 associated with the conveyor assembly 582 and mounted on sprocket wheels 602 and 604 carried on shafts 606 and 608, each rotatably journalled in bearing blocks 610 supported on the members 500 and 502. The sprocket wheel 604 constitutes the driving sprocket for the conveyor assembly 582 and, accordingly, it is keyed to the shaft 608 and the latter is driven through a chain and sprocket assembly 612 from a shaft 614 (see also Figs. 1 and 4) rotatably journalled at one end in a bearing block 616 secured to the longitudinal frame member 75 and at its other end in a bracket or support 618 mounted on the transverse frame member 76. The shaft 618 is operatively and releasably connected through a clutch mechanism designated in its entirety at 620 to the output shaft 268 of the dual output spiral gear mechanism 266. A shiftable clutch collar 622 and operating lever 624 therefor permit selective manual engagement and disengagement of the clutch in order that the operation of the conveyor assembly 582 may be discontinued when the partition blank feeding and folding mechanism is not employed, as for example, when the machine is used for opening carbon blanks having transverse as well as longitudinal partition walls.

A chain table or support 626 extends along the upper straightaway portion of the conveyor 582 and is suitably secured in position between the two longitudinal members 524 and 526 by means of suspension members 627 and shelf supports 629, bolted as at 631 to the members 524 and 526. The chain table serves to maintain the chain 600 elevated and prevent sagging thereof in the straightaway portion thereof. The picker devices 580 are each carried by one of the chain links 628 and the supporting shafts or pins 630 of the link are extended laterally beyond the chain width and carry rollers 632 which ride upon the chain table 626. The upper end of each picker device 580 is formed with a rectangular block or head 634 adapted to travel on the upper surfaces of a pair of polished steel rails 638 suitably secured to the shelf support 629. The upper forward edge of the heads 634 assume an elevation slightly higher than the level of the platform and project upwardly thereabove a distance not in excess of the thickness of one of the blanks P. The channeled rails 638 extend rearwardly completely across the vertical confines of the feed magazine 20 and the rear ends of the guide channels 636 are positioned so as to be in register with the heads 634 of the picker devices 580 as the latter move off of the sprocket wheel 602 into the straightaway portion of the conveyor 582. The heads 634 thus enter the channels 636 and the latter serve to guide the heads across the feed magazine so that as each head traverses the magazine bottom it engages the lowermost blank in the stack and causes it to be impelled through the gate opening provided by the lower ends of the guide posts 534 and from these onward toward the inserting station I.

It is to be noted that by adjusting the height of the guide posts 534, the width of the gate opening may be varied to accommodate blanks of different thicknesses. Similarly, by turning the adjusting nipple 560 (Fig. 14) of the quick release mechanism 552, the height of the guide bar 550 above the platform 522 may be varied to likewise accommodate different blank thicknesses.

The chain drop-off mechanism

The forward end of the channel rails 638 terminate rearwardly of the inserting station I and interposed between these ends and the inserting station is a longitudinally adjustable chain guide carriage 640 (Fig. 10) the sides of which are guided in the longitudinal members 524 and 526. The guide carriage 640 is provided with upstanding sides 642 having opposed guideways 644, the rear ends of which are flared as at 646 to provide for entrance into the guideways 644 of the chain 600 after the same has moved off of the chain support 626. The level of the guideways 644 is somewhat below the chain level when the chain rests on the support 626 and thus, when the chain enters the guideways 644 at drops-off in height to such an extent that the picker members 580 carried thereby are moved below the level of the blanks P so as to clear the same and terminate their impelling influence on the blanks. The bottom of the carriage 640 is provided with a rack 648 which meshes with a pinion 650 mounted on a transverse shaft 652 suitably journalled in the framework 77. An adjusting knob 654 (Fig. 2) mounted on the outer end of the shaft 652 and meshing with the rack 648 affords manual means for adjusting the longitudinal setting of the carriage 640.

From the above description it will be seen that as the picker members 580 drop off in elevation so as to release the blanks P, these blanks are left resting on the forward portion of the feed table or platform 522. Further movement of the blanks along the platform is accomplished by the impelling action of the succeeding blanks which successively move into a position to displace the previously deposited blanks. The blanks are ultimately deposited successively upon the inserting ram 23 which assumes the broken line position shown in Fig. 10. The drop off point wherein the picker members release the blanks P thus controls the ultimate position of the blanks when they are pushed off of the feed platform 522 and deposited on the ram 23. In order that the blanks shall be deposited squarely on the ram head 23 in accurate register therewith and in register with the slots k (Fig. 11) formed in the bottom wall e of the carton shell S positioned at the inserting station I above the ram head 23, it is necessary that the position of the drop-off carriage 640 be adjusted so that the distance from the drop-off point of release to the extreme forward edge of the feed platform 522 be an exact multiple of the width of a partition blank. It is for this reason that the adjustable drop-off mechanism just described has been provided.

THE PARTITION INSERTING MECHANISM

The partition inserting mechanism 22 is best illustrated in Figs. 1, 2 and 10 and, in addition to the inserting ram head 23, includes ram-reciprocating mechanism supported upon the L-shaped frame or cradle 512 (Fig. 10). The ram head 23 is carried at the upper end of a plunger 660 of the dual rod type and which is slidable in guides 662 supported in brackets 664 carried by the cradle members 514 and 516. The plunger 660 carries a collar 665 which is connected through a short link 667 to one end of a bell crank lever 666 pivoted as at 668 to the upper end of a bracket 670, the bracket being secured as at 672 to the cradle bottom 516. The other end of the lever 666 is pivotally connected to the free end of a plunger 674 associated with a pneumatic cylinder 676 pivoted as at 678 to a bracket 680 bolted as at 682 to the outer end of the cradle frame member 516. The cylinder 676 is operatively connected through air lines 682 and 684 (see also Fig. 16) to the cam controlled valve V6 associated with the cam control mechanism 25 of Figs. 4 and 16. A solenoid valve Vs (Fig. 4) is interposed in the air line 684 for purposes that will be set forth presently.

From the above description it will be seen that air under pressure admitted through the fluid lines 684 to the rear end of the cylinder 676 will serve to advance the plunger 674 in a direction to move the bell crank lever counterclockwise as seen in Fig. 10 to thus elevate the ram plunger 660 and move the ram head 23 from its retracted position wherein it is in register with the forward end of the platform 522 to an elevated position wherein a fully folded partition P resting upon the ram head is inserted into an opened carton shell S positioned at the inserting station I. Admission of air to the other end of the cylinder 676 will, of course, cause retraction of the plunger 674 and consequent retraction of the ram head 23 to its lowered position.

THE PLUNGER DISABLING MECHANISM

Referring now to Figs. 1, 1a and 16, a micro-switch assembly 688, the internal contacts of which are normally closed, is mounted on a strut 690 extending between the U-shaped arbors 460. The switch 688 is electrically connected in series with the solenoid winding of the valve Vs (Figs. 4 and 16) and a source of current supply such as a battery. The switch 688 is provided with a spring pressed sensing finger 692 which normally projects into the space occupied by an opened carton shell S at the inserting station I and is adapted to be moved by contact with the shell to the dotted line position shown in Fig. 1a wherein the shell serves to maintain the switch contacts open. The solenoid valve SV is of the normally open type, that is, it remains open when deenergized and, upon energization thereof, it is adapted to become closed. As a consequence, when a carton shell S is not present at the inserting station, the sensing finger 692 assumes its full line position (Fig. 1a) so as to complete the circuit through the valve SV and cause the latter to become closed, thus preventing air from entering the cylinder 676 at the point in the machine cycle where the cam C6 opens the valve V6 so that the ram head 23 and partition P disposed thereon will not be projected upwardly. By such an arrangement, needless machine operations are avoided and indiscriminate projection of the partitions P upwardly when there is no carton shell to receive them is averted.

THE TIMER CONTROL MECHANISM

The machine is adapted to operate cyclicly under the influence of the timer control mechanism 23 diagrammatically shown in Fig. 16 and incidently appearing in Figs. 1, 3 and 4. This mechanism includes the previously mentioned cams C1, C2, C3, C4, C5 and C6, all of which are fixedly mounted on a cam shaft 700 rotatably journalled in bearing supports 702 (Fig. 4) suitably secured to the machine framework 32. The shaft 700 carries at one end thereof a sprocket wheel 704. A chain 706 passes over the sprocket wheel 704 and over a similar sprocket wheel 708 mounted on the output shaft 268 of the spiral gear mechanism 266 and serves to normally rotate the cam shaft 700 continuously.

The various valves V1, V2, V3, V4, V5 and V6 are mounted alongside the cam shaft 700 and are operated under the control of the cams C1, C2, C3, C4, C5 and C6 respectively. As shown in Fig. 3, are valve V4 is provided with a plunger 710 which is operated by means of a lever 712 pivoted as at 714 to the plunger and pivoted as at 716 medially of its ends to a bracket 717 carried on the valve casing. The free end of the lever 712 carries a cam follower in the form of a roller 718 which rides on the cam C4. The operation of the various other valves is substantially the same as described in connection with the operation of the valve V4.

THE CYCLIC OPERATION OF THE MACHINE

The machine is designed to deliver at the discharge station D one fully opened carton shell S with a folded partition P in place therein at the end of each machine cycle, the cycle being controlled by the timing mechanism 25. The time elapsing from the commencement of machine operations upon a given carton shell blank withdrawn from the feed hopper 10 until the delivery of the squared up, partition-containing shell at the discharge station consumes approximately three full machine cycles so that no less than three carton setting up operations, each involving a different carton shell, are in progress within the machine at any given instant.

To facilitate the description of the machine operation, it may arbitrarily be assumed that a particular machine cycle commences at or shortly before the moment when the vacuum plunger assembly 12 is set into operation to remove the leading blank B in the feed hopper 10 and deposit the same in the longitudinal guide channel 11. It will be understood that in view of the three cycle duration of each blank in the machine as previously described, succeeding blanks which have previously been operated upon and which have attained various degrees of erection, will exist simultaneously in the machine with the blank emerging from the feed hopper. For convenience, as shown in the timing diagram of Fig. 17, wherein a full machine cycle has been portrayed diagrammatically, the cycle has been divided into degrees and in the description which follows the time instants and intervals are approximate.

It is to be noted at this time that the valves V1, V2, V3 and V6 are two way valves, each having two outlet ports leading to the opposite ends of the respective air cylinder which it controls. The valves V4 and V5 are one way valves of the shut off type each having a single outlet port leading to the respective air cylinder which it controls.

Figure 17:
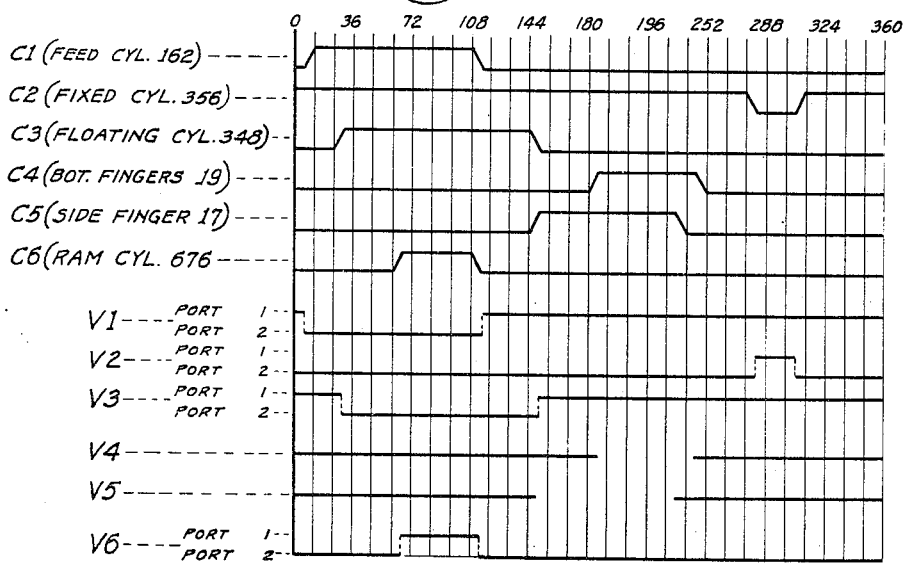
Fig. 17 is a timing chart representing the cyclic cam controlled operation of the various machine instrumentalities of the invention during one complete cycle.

Referring now to the timing diagram of Fig. 17 in conjunction with the schematic view of Fig. 16, at approximately 6° in the machine cycle, the cam C1 causes the valve V1 to open its port leading through the air line 188 to the cylinder 162 (Figs. 2 and 3) to thus advance the plunger 160 and move the suction cups 150 into firm engagement with the leading carton shell blank B contained within the feed hopper 10. The valve V4 remains in this condition until approximately 108° in the cycle when it then closes its #1 port and opens its #2 port leading through the air line 186 so as to retract the plunger 160.

Movement of the plunger 160 forwardly is accompanied by the application of vacuum to the cups 150 and movement of the plunger rearwardly is accompanied by the termination of such application of vacuum as previously set forth so that during the reciprocal stroke of the plunger as just described, the cups become seated upon the leading blank B at a time when vacuum is applied thereto and they move away from the feed hopper 10 while vacuum still is applied. The leading blank is thus carried or pulled over the lip 124 and brought into alignment with the guide channel 11 at which time the application of vacuum to the cups 150 is discontinued due to the exposure of the vent opening 160 to the atmosphere. The blank B is thus released and falls into the channel 11 at the feed station preparatory to engagement thereof by the impelling finger 218 (Figs. 5 and 6).

The gear ratios involved in the driving train leading from the motor M to the driven shaft 270 of the gear reduction device 266 and in the driving train leading to the cam shaft 700 are such that the carriage will assume approximately its dotted line position (Fig. 1) when the carton blank B is deposited in the guide channel 11. As the carriage 200 moves to the right, the finger 218 will engage the edge of the blank and impel the same along the channel to the opening station O.

At approximately 24° in the machine cycle, the cam C3 causes the #1 port of the valve V3 to become open so as to admit air under pressure through the air line 368 (Fig. 7) to move the plunger 346 of the floating air cylinder 348 to the right and thus swing the lever 334 in a counterclockwise direction as seen in Fig. 7 so as to cause the plunger 302 associated with the opposed vacuum cylinders 300 to advance toward the opposite sides of a flattened blank B positioned at the open station O. It should be understood that the particular blank B engaged by the suction cups 318 as a result of such movement of the plungers 302 is a blank which was withdrawn from the feed magazine 10 during a preceding cycle. At approximately 144° in the cycle, the #2 port of the valve V3 is caused to open under the influence of the cam C3 and air is admitted through the line 370 leading to the cylinder 348 so that the plunger 346 is retracted and the plunger assemblies 14 and 15 are retracted to their intermediate positions as indicated in Figs. 7 and 13 and designated at I. In this intermediate position, the cups 318 are under vacuum pressure and they maintain the carton shell S in its fully extended or squared up condition preparatory to performance of the automatic locking operation of the notches m and n under the influence of the side and bottom flexing fingers 17 and 19 respectively.

At approximately 144° in the machine cycle, the cam C5 causes the valve V5 to become open to admit air through the line 404 leading to the cylinder 400 (Fig. 16) to advance the plunger 398 thereof and operate the previously mentioned train of mechanism including the gears 386 and 388 and swing the carton shell side flexing finger 17 in a direction to engage the carton shell side c (Fig. 12) and flex the same inwardly of the shell so that the notch m in the partition wall f will clear the notch n in the bottom wall e for interlocking purposes as previously described. At approximately 180° in the cycle, the cam C4 will cause the valve V4 to become open to admit air through the line 442 (see also Fig. 8) to advance the plunger 434 and operate the train of mechanism including the link 432 and lever 430 so as to elevate the carton shell bottom flexing fingers 19 to flex the carton bottom e upwardly so as to bring the notches m and n into register. The bottom flexing fingers 19 remain in their elevated position until approximately 246° in the machine cycle, but before they again assume their lowered position, the side flexing finger 17 swings away from the carton shell side at approximately 212° in the cycle so that the notches become interlocked. This reverse movement of the finger 17 is under the influence of the spring 389 at a time when the cam C5 closes the valve V5 and discontinues the supply of air to the cylinder 400.

At approximately 258° in the cycle, the cam C2 causes the #1 port of the valve V2 to open and admit air through the line 364 to the fixed cylinder 356 (see also Figs. 3 and 7) to retract plunger 355 thereof a slight distance. Such retraction of the plunger 355 takes place while the plunger 346 of the cylinder 348 is still retracted so that an additional movement of the lever 334 tending to move the same from its intermediate position I in Fig. 7 to its fully retracted position R will take place. This additional movement of the lever 334 causes the cups 318 to clear the carton shell sides inasmuch as movement of the vent opening 316 (Fig. 13) into communication with the atmosphere will bleed the cylinder 310 and relieve the cups 318 of their reduced pressure. The shell is thus free to move longitudinally toward the inserting station under the influence of the pair of impelling fingers 244 carried by the carriage assembly 13.

At approximately 300° in the machine cycle, the #2 port of the valve V2 is opened and air is admitted to the cylinder 356 through the line 366 to restore the plunger 355 to its retracted position.

At approximately 360° in the machine cycle, the cam C6 causes the #2 port of the valve V6 to open to admit air through the line 684 (see also Fig. 10) and valve Sv (Fig. 4) to the cylinder 676 to advance the plunger 674 thereof. Such movement of the plunger 674 will operate through the bell crank lever 666 and associated mechanism to project the ram head 23 upwardly and introduce a folded partition P into an opened carton shell S in the manner previously described. It is to be understood that the particular shell S involved is a shell previously operated upon by the feeding mechanism at the feeding station F two full cycles removed and one operated upon at the opening station one full cycle removed. At approximately 212° in the cycle, the cam C6 causes the valve V6 to open its #1 port to admit air through the line 682 to cause retraction of the plunger 674 and consequent lowering of the ram head 23.

The fully set up cartons S are moved from the inserting station I to the discharge station D under the impelling influence of preceding cartons issuing from the opening station during each machine cycle.

In the event that an opened carton shell S is absent at the inserting station at a time in the machine cycle that the ram head 23 ordinarily becomes effective to project a folded partition P upwardly, the sensing finger 692 (Fig. 1a) will be projected across the adjacent guide rail 464 and into the space normally occupied by an opened carton shell. Such positioning of the finger 692 will close the contacts of the microswitch assembly 688 to complete an electric circuit through the valve SV (Figs. 4 and 16) to thus energize the valve and close the same. Closure of the valve SV will prevent air from being admitted through the line 684 to the ram cylinder 676 when the cam C6 causes the valve V6 to open its #1 port to admit air under pressure to the air line 684. Under these circumstances, the ram 23 will remain in its lowered position and no partition P will be projected upwardly at the inserting station I.

The present machine is capable of use in the opening of folded carton blanks provided with transverse as well as longitudinal partition walls and which require no partition insert P. When such cartons are processed by the machine, the valve V6 can be manually disabled to prevent ram operation and the manual clutch lever 624 (Fig. 1) may be moved to disengage the clutch 620 so that no power will be applied to the partition feeding and folding mechanism 21.

MODIFIED CONTROL MECHANISM

Referring now to Fig. 16, it has been described previously how, when a carton shell S is not present at the inserting station I the switch 688 will become closed to establish an electrical circuit through the valve SV so that the latter will, in turn, prevent the flow of air in the closed pneumatic circuit including both the valve V6 and the cylinder 676, thus disabling the partition inserting plunger 23. According to the modified form of pneumatic control mechanism shown in Figs. 19 and 20, means are also provided for automatically disengaging the clutch mechanism 620 if no carton shell is present at the inserting station thus disabling the driving mechanism for the chain conveyor assembly 582 so that the advance of partition blanks P along the platform 522 will be halted and so that the folded blanks will not be discharged to the floor over the forward edge of the platform.

To accomplish this aim, the normally open valve SV is removed from the air line 684 and is connected in a separate air line 700 in series with a manual shut off valve 701, the line leading to one end of a cylinder 702 having a piston 703 disposed therein and spring pressed as at 704. The piston 703 is operatively connected through a plunger 705 and short pivoted link 706 to the lever 624 which controls the operation of the clutch mechanism 620.

From the above description it will be seen that with the valve 701 open, failure of the sensing finger 692 to sense the presence of a carton shell S at the inserting station I will result in energization of the winding of the solenoid valve SV and consequent closure of the valve so that the supply of air normally conducted to the cylinder 702 through the normally open valve SV will be discontinued. The spring 704 will thus move the piston 703 to the position shown in Fig. 20 and cause the clutch mechanism 620 to become disengaged to stop the operation of the chain conveyor assembly 612 and its associated mechanism.

While the present description sets forth a preferred embodiment of the invention, various changes may be made in the construction without departing from the spirit of the invention, and it is therefore desired that the present embodiment be considered illustrative and not restrictive, reference being had to the appended claims rather than to the foregoing description to indicate the scope of the invention.

I claim:

1. In a machine for opening flat carton shell blanks of the type having major and minor side walls, means for feeding the blanks one at a time successively to a stationary position at an opening station, squaring up mechanism at the opening station comprising opposed vacuum devices movable toward and away from each other for simultaneously engaging the major sides of the blanks at the opening station and pulling the same apart to produce the squared up carton shells, such vacuum devices being movable from positions of close proximity wherein they engage the opposite sides of a blank disposed therebetween to separated intermediate positions wherein the major sides of the blank are pulled apart a distance sufficient to square up the blank, such devices being movable from their intermediate positions to positions wherein they are further separated so as to clear the major sides of the shell, and means for moving said vacuum devices between such various positions, such last mentioned means comprising a first motor having a casing and a relatively movable member operatively connected to the vacuum devices and operable upon actuation of the motor to impart an initial movement to the member, a second motor likewise having a casing and a relatively movable member, said latter member being operatively connected to the casing of the first motor, the second motor being operable upon actuation thereof to shift bodily the position of the first motor to impart a final movement to the member of the first motor, and means for successively actuating said motors.

2. In a machine for opening flat carton shell blanks of the type having major and minor side walls, the structure set forth in claim 1 in which the first and second motors are in the form of fluid actuated devices each including a cylinder and a reciprocable plunger therein and in which the plunger of one device is operatively connected to the casing of the other device.

3. In a machine for opening flat carton shell blanks of the type having major and minor side walls, the structure set forth in claim 1 in which the first and second motors are each in a form of a fluid motor having a cylinder and a plunger reciprocable therein between advanced and retracted positions and operable upon actuation of the motor to become retracted within the cylinder, the plunger of one motor being operatively connected to the cylinder of the other motor.

4. In a machine for opening flat carton shell blanks of the type having major and minor side walls, the structure set forth in claim 1 in which the first and second motors are each in the form of pneumatic air cylinders operatively connected in tandem substantially as described.

5. In a machine for opening flat carton shell blanks of the type having major and minor side walls, the structure set forth in claim 1 in which each of said vacuum devices comprises a pair of upper vacuum cups for engaging the upper portions of the major side walls of the carton shells and a pair of lower vacuum cups for engaging the lower portions of the major side walls of the shells, and means common to the vacuum cups of each vacuum device for applying reduced pressure thereto.

6. In a machine for opening flat slotted bottom wall carton shell blanks and for inserting into each carton shell through the slotted bottom wall thereof a partition member to produce an assembled carton, means for feeding the blanks to an opening station, means at said opening station for opening and setting up the blank with the bottom wall thereof in operative position, means for advancing the set up blank to an inserting station, means for delivering to said inserting station partition blanks and folding them to substantially U-shape partitions with the arms thereof aligned with and underlying the slots in said bottom wall, means at said inserting station for moving said partition upward and thereby inserting the arms thereof through said bottom wall slots to produce a completely assembled carton, and means for discharging the assembled cartons from the machine.

7. In a machine for opening flat slotted bottom wall carton shell blanks and for inserting into each carton shell through the slotted bottom wall thereof a partition member to produce an assembled carton, means for feeding the blanks to an opening station, means at said opening station for opening and setting up the blank with the bottom wall thereof in operative position, means for advancing the set up blank to an inserting station, an inserting ram disposed to underlie a set up carton blank at said inserting station, means for delivering to said inserting station partition blanks and folding them to substantially U-shaped partitions disposed between said ram and the bottom wall of said carton with the arms of said partition aligned with the slots of said bottom wall, means for moving said ram upward incident to positioning of a partition at said inserting station effective for inserting said partition through said bottom wall thereby completing assembly of the carton, and means for discharging the assembled cartons from the machine.

8. In a machine for opening flat slotted bottom wall carton shell blanks and for inserting into each carton shell through the slotted bottom wall thereof a partition member to produce an assembled carton, means for feeding the blanks to an opening station, means at said opening station for opening and setting up the blank with the bottom wall thereof in operative position, means for advancing the set up blank to an inserting station, an inserting ram disposed to underlie a set up carton blank at said inserting station, means for delivering to said inserting station partition blanks and during such delivery folding them to substantially U-shaped partitions disposed between said ram and the bottom wall of said carton with the arms of said partition aligned with the slots of said bottom wall, means for moving said ram upward incident to positioning of a partition at said inserting station effective for inserting said partition through said bottom wall thereby completing assembly of the carton, and means for discharging the assembled cartons from the machine.

9. In a machine for opening flat slotted bottom wall carton shell blanks and for inserting into each carton shell through the slotted bottom wall thereof a partition member to produce an assembled carton, means for feeding the blanks to an opening station, means at said opening station for opening and setting up the blank with the bottom wall thereof in operative position, means for advancing the set up blank to an inserting station, a magazine for flat partition blanks, a track leading from said magazine to said inserting station, means for removing partition blanks singly from said magazine, means for moving the partition blanks along said track to said inserting station while folding them to substantially U-shaped partitions and disposing the folded partition beneath the set up carton blank with the arms of the partition aligned with the slots in the bottom wall of the blank, a reciprocating inserting ram disposed to underlie a partition at said inserting station, means for moving said ram upward incident to positioning of a partition at said receiving station effective for inserting said partition through said bottom wall thereby completing assembly of the carton, and means for discharging the assembled cartons from the machine.

References Cited in the file of this patent

UNITED STATES PATENTS

| | | |
|---|---|---|
| 599,615 | Lederer | Feb. 22, 1898 |
| 1,373,187 | Freeman | Mar. 29, 1921 |
| 2,065,441 | Ford et al. | Dec. 22, 1936 |
| 2,072,065 | Brown et al. | Feb. 23, 1937 |
| 2,196,982 | Cox | Apr. 16, 1940 |
| 2,281,516 | Royal | Apr. 28, 1942 |
| 2,444,504 | Grogan | July 6, 1948 |
| 2,558,456 | Palmer | June 26, 1951 |
| 2,645,984 | Linstedt | July 21, 1953 |
| 2,655,081 | Burger | Oct. 13, 1953 |
| 2,656,656 | Murdoch et al. | Oct. 27, 1953 |